(12) United States Patent
Umeyama et al.

(10) Patent No.: US 10,964,970 B2
(45) Date of Patent: Mar. 30, 2021

(54) NON-AQUEOUS ELECTROLYTIC SECONDARY BATTERY AND METHOD OF MANUFACTURING THE SAME

(71) Applicant: TOYOTA JIDOSHA KABUSHIKI KAISHA, Toyota (JP)

(72) Inventors: Hiroya Umeyama, Okazaki (JP); Tatsuya Hashimoto, Osaka (JP); Naoyuki Wada, Hirakata (JP); Yusuke Fukumoto, Toyonaka (JP); Yuji Yokoyama, Moriguchi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 15/516,228

(22) PCT Filed: Aug. 31, 2015

(86) PCT No.: PCT/JP2015/004408
§ 371 (c)(1),
(2) Date: Mar. 31, 2017

(87) PCT Pub. No.: WO2016/051662
PCT Pub. Date: Apr. 7, 2016

(65) Prior Publication Data
US 2017/0309945 A1    Oct. 26, 2017

(30) Foreign Application Priority Data
Oct. 2, 2014  (JP) ................................. 2014-203951

(51) Int. Cl.
*H01M 10/04*    (2006.01)
*H01M 4/04*     (2006.01)
*H01M 10/052*   (2010.01)

(52) U.S. Cl.
CPC ....... *H01M 10/045* (2013.01); *H01M 4/0435* (2013.01); *H01M 10/049* (2013.01); *H01M 10/052* (2013.01)

(58) Field of Classification Search
CPC ............. H01M 10/052; H01M 10/045; H01M 10/049; H01M 4/0435; Y02E 60/10
See application file for complete search history.

(56) References Cited

U.S. PATENT DOCUMENTS

| 2005/0064096 A1* | 3/2005 | Kurihara | ............... B05B 13/025 427/215 |
| 2013/0309530 A1* | 11/2013 | Shim | ................... H01M 2/1686 429/61 |
| 2014/0170464 A1 | 6/2014 | Iwase | |

FOREIGN PATENT DOCUMENTS

| CN | 102306746 A | 1/2012 |
| CN | 103872385 A | 6/2014 |

(Continued)

*Primary Examiner* — Miriam Stagg
*Assistant Examiner* — Lilia Nedialkova
(74) *Attorney, Agent, or Firm* — Sughrue Mion, PLLC

(57) ABSTRACT

A flat-plate portion of a negative electrode composite material layer includes a first end portion at one end portion in a direction of axis of winding of a flat electrode winding assembly, a second end portion located opposite to the first end portion, and a central portion lying between the first end portion and the second end portion. The flat-plate portion of the negative electrode composite material layer is provided with a plurality of communication grooves. The communication groove includes a first terminal end portion at the first end portion, includes a second terminal end portion at the second end portion, includes in the central portion, a starting portion located closer to a bottom portion of a prismatic case relative to the first terminal end portion and the second (Continued)

terminal end portion, and extends from the starting portion toward the first terminal end portion and the second terminal end portion.

10 Claims, 18 Drawing Sheets

(56) References Cited

FOREIGN PATENT DOCUMENTS

| JP | 11154508 A | 6/1999 |
|----|------------|--------|
| JP | 2005-285607 A | 10/2005 |
| JP | 2009289609 A | 12/2009 |

\* cited by examiner

NON-AQUEOUS ELECTROLYTIC SECONDARY BATTERY AND METHOD OF MANUFACTURING THE SAME

CROSS REFERENCE TO RELATED APPLICATIONS

This application is a National Stage of International Application No. PCT/JP2015/004408, filed on Aug. 31, 2015, which claims priority from Japanese Patent Application No. 2014-203951, filed on Oct. 2, 2014, the contents of all of which are incorporated herein by reference in their entirety.

TECHNICAL FIELD

The present invention relates to a non-aqueous electrolytic secondary battery and a method of manufacturing the same.

BACKGROUND ART

Japanese Patent Laying-Open No. 2005-285607 (PTL 1) discloses a non-aqueous secondary battery in which a groove is formed in a surface of a positive electrode composite material layer obtained by coating a core with a positive electrode composite agent paint followed by drying and compression to a defined thickness, by causing the positive electrode composite material layer to pass through a gap between an upper roll having a protruding projection and a lower roll.

CITATION LIST

Patent Literature

[PTL 1] Japanese Patent Laying-Open No. 2005-285607

SUMMARY OF INVENTION

Technical Problem

A non-aqueous electrolytic secondary battery for mount on a car represented by an electric vehicle (EV) is required to have life as long as 10 years or more. During long-term use of a battery, owing to repetition of a charging and discharging cycle or storage for a long time, a solid electrolyte interface (SEI) grows on a surface of a negative electrode active material. Since SEI grows while a lithium (Li) source in the battery is consumed, degradation of a capacity of the battery is caused with growth of SEI.

In order to suppress growth of SEI, a stable coating may be formed in advance on a surface of a negative electrode active material. For example, a coating inhibiting growth of SEI can be formed by reductive degradation of an additive at the surface of the negative electrode active material at the time of first charging.

In a large-sized battery for an EV or the like, however, formation of a coating with an additive tends to be uneven in an electrode winding assembly, which interferes achievement of longer life. In a large-sized battery for car mount required to be high in energy density, an area of an electrode is greater and the number of turns in the electrode winding assembly and the number of stacked electrodes are greater than those of a small-sized battery for consumer use. Therefore, in impregnating the inside of the electrode winding assembly with an electrolyte, some of a gas contained in the electrode winding assembly is not completely removed and a portion where substitution of the gas with the electrolyte is insufficient (that is, a portion where wetting of a negative electrode composite material layer is insufficient) is created in a central portion of the electrode winding assembly. Since an absolute amount of an additive is insufficient in that portion, a coating is thin (or coarse). On the other hand, since the electrolyte tends to stay at an end portion in a direction of axis of winding of the electrode winding assembly which serves as an inlet of the electrolyte at the time of impregnation and also serves as an outlet of the gas, an amount of additive is excessive and a thick (or dense) coating is formed. Thus, formation of a coating in an in-plane direction of the negative electrode composite material layer becomes uneven. When distribution of the coating is uneven, subsequent growth of SEI also becomes uneven, which aggravates unevenness of electrode reaction.

In addition, in a large-sized battery for car mount, rapid charging and discharging, that is, high-current (high-rate) charging and discharging, is carried out. In high-rate charging and discharging, an electrode (a porous electrode composite material layer) greatly expands and contracts, and hence release of an electrolyte from an electrode and suction of the electrolyte into the electrode take place. Here, however, an amount of release of the electrolyte is greater than an amount of suction, and hence release of the electrolyte tends to be dominant. Consequently, the electrolyte is gradually pushed from the central portion of the electrode winding assembly toward the end portion in the direction of axis of winding. Under such circumstances, in a large-sized battery for car mount, distribution of the electrolyte becomes uneven in the in-plane direction of the negative electrode composite material layer, and distribution of supporting salt (Li salt) contained in the electrolyte also becomes uneven. The Li salt is responsible for ion conduction between positive and negative electrodes. Therefore, when distribution of Li salt is uneven, electrode reaction also becomes uneven.

As set forth above, in a large-sized battery, formation of a coating tends to be uneven during manufacturing, and distribution of Li salt also tends to be uneven during use. With such unevenness being combined, unevenness of electrode reaction is aggravated in the in-plane direction of the negative electrode composite material layer and progress of degradation is locally accelerated, which results in difficulty in achievement of longer life of the battery.

PTL 1 has made an attempt to improve ease of impregnation with an electrolyte and to achieve uniform distribution of the electrolyte in the electrode winding assembly by forming a V-shaped groove in a surface of an electrode composite material layer. Namely, a paint (which may also be called a "paste" or "slurry") obtained by dispersing an electrode active material in a prescribed solvent is fabricated, a core is coated with such a paint followed by drying to thereby obtain an electrode composite material layer, thereafter the electrode composite material layer is compressed to a prescribed thickness, and a V-shaped groove is formed in the surface of the electrode composite material layer by pressing and contacting a roll having a projection against the electrode composite material layer. When a groove is formed in the electrode composite material layer with such a method, however, density of the composite material becomes locally high around the groove. Thus, around the groove, reactivity (Li acceptability in a case of a negative electrode composite material layer) locally lowers, which may conversely aggravate unevenness of electrode reaction.

The present invention was made in view of the problems above. Therefore, an object of the present invention is to provide a non-aqueous electrolytic secondary battery having long life.

Solution to Problem (1) A non-aqueous electrolytic secondary battery includes a flat electrode winding assembly including a positive electrode composite material layer and a negative electrode composite material layer and a prismatic case including a bottom portion, a sidewall continuing to the bottom portion, and a lid continuing to the sidewall and located opposite to the bottom portion.

The prismatic case accommodates the flat electrode winding assembly such that a direction of axis of winding of the flat electrode winding assembly intersects with a direction from the bottom portion toward the lid. The flat electrode winding assembly includes a flat portion formed by stacking flat-plate portions of the positive electrode composite material layer and the negative electrode composite material layer. The flat portion faces the sidewall of the prismatic case. The flat-plate portion includes a first end portion at one end portion in the direction of axis of winding of the flat electrode winding assembly, a second end portion located opposite to the first end portion, and a central portion lying between the first end portion and the second end portion.

The flat-plate portion of the negative electrode composite material layer is provided with a plurality of communication grooves extending from the first end portion to the second end portion. The communication groove includes a first terminal end portion at the first end portion, includes a second terminal end portion at the second end portion, includes in the central portion, a starting portion located closer to the bottom portion of the prismatic case relative to the first terminal end portion and the second terminal end portion, and extends from the starting portion toward the first terminal end portion and the second terminal end portion.

The negative electrode composite material layer includes a plurality of granules. The granule contains a negative electrode active material and a binder.

According to the construction above, a communication groove extending from the central portion of the negative electrode composite material layer from which a gas is less likely to escape during impregnation (that is, which is less likely to be wetted) to both end portions of the electrode winding assembly which serve as gas outlet ports is provided. The starting portion of the communication groove located in the central portion is located closer to the bottom portion (typically, a lowermost side in a vertical direction) relative to the first terminal end portion and the second terminal end portion in a direction from the bottom portion toward the lid (typically, upward in the vertical direction). Therefore, during impregnation, a gas can readily be released through the communication groove and an electrolyte and an additive for formation of a coating can reach the central portion of the negative electrode composite material layer. Thus, unevenness in formation of the coating in an in-plane direction of the negative electrode composite material layer can be suppressed.

Such a communication groove also functions as a return path for the electrolyte released from the negative electrode composite material layer or a positive electrode composite material layer during high-rate charging and discharging. Namely, the electrolyte pushed toward the end portion in the direction of axis of winding of the flat electrode winding assembly during high-rate charging and discharging returns to the central portion of the flat electrode winding assembly along the communication groove. Thus, unevenness in distribution of Li salt is suppressed and shortening of life in high-rate charging and discharging is suppressed.

The negative electrode composite material layer in the construction above is a composite material layer obtained from a granule, rather than a composite material layer obtained from a paint. The granule is a wet powdery and granular material higher in ratio of a solid content (a ratio of a mass occupied by a component other than a liquid in a mixture) than a paint, and can form a negative electrode composite material layer through compression forming between rolls while it is wet. Here, by providing a mark (a protrusion) in a shape in conformity with the communication groove in a forming roll, a negative electrode composite material layer having a communication groove can be formed. Since the granule is in a wet state and exhibits fluidity and flexibility during forming, density of the composite material does not locally increase in the communication groove and around the groove and a negative electrode composite material layer having density of the composite material substantially uniform in the in-plane direction in spite of presence of the groove in the surface can be formed. Thus, unevenness in electrode reaction due to variation in density of the composite material can be suppressed.

Here, "substantially uniform density of the composite material" means that density of the composite material in a portion smallest in thickness (a bottom of the communication groove) of the negative electrode composite material layer is at least 0.90 and at most 1.10 time as high as density of the composite material in a portion largest in thickness (a portion except for the communication groove).

From the foregoing, in the non-aqueous electrolytic secondary battery in [1] above, distribution of the coating and distribution of Li salt are substantially uniform and variation in density of the composite material is also less, and hence life of the battery improves.

(2) In the flat-plate portion, preferably, the communication groove is line symmetric with respect to a straight line passing through the starting portion and extending in a direction intersecting with the direction of axis of winding. Then, distribution of the electrolyte in the electrode winding assembly can be more uniform.

(3) In the flat-plate portion, preferably, the communication groove extends in a V shape. Then, a gas is more easily removed at the time of impregnation.

(4) Preferably, one or more and 50 or less communication grooves are provided in one flat-plate portion. By providing one or more communication grooves in one flat-plate portion, a gas is readily removed at the time of impregnation and unevenness of distribution of the electrolyte in the in-plane direction of the negative electrode composite material layer can be less. When the number of communication grooves exceeds 50, productivity may lower.

(5) Preferably, relation of $1<\theta \times n<90°$ and $\mathrm{Tan}(\theta \times n)=2H/W$ is satisfied, where n represents the number of the communication grooves included in one flat-plate portion, W represents a dimension in the direction of axis of winding (a width) of the flat-plate portion of the negative electrode composite material layer, H represents a dimension in the direction intersecting with the direction of axis of winding (a height) of the flat-plate portion, and $\theta$ represents an angle formed between an inclined portion of the communication groove extending from the starting portion toward the first terminal end portion or the second terminal end portion and the direction of axis of winding. Then, a plurality of communication grooves can efficiently be arranged in the flat-plate portion.

The non-aqueous electrolytic secondary battery described in [1] to [5] above can be manufactured, for example, with a method as follows.

(6) A method of manufacturing a non-aqueous electrolytic secondary battery includes a granulation step of obtaining the plurality of granules by mixing and granulating the negative electrode active material, the binder, and a solvent and a forming step of obtaining the negative electrode composite material layer having the communication groove by compression forming the plurality of granules between a first roll having in a surface, a mark in a shape in conformity with the communication groove and a second roll.

As described previously, by forming a negative electrode composite material layer from a granule which is a wet powdery and granular material, density of a composite material in the negative electrode composite material layer can be substantially uniform in the in-plane direction while a groove is formed in the surface.

(7) Preferably, in the forming step, a ratio of a solid content of the plurality of granules is not lower than 65 mass % and not higher than 80 mass %. When the ratio of a solid content is lower than 65 mass %, roll forming may become difficult, and when it exceeds 80 mass %, fluidity during roll forming may lower and density of the composite material cannot be uniform in some cases. A ratio of a solid content of a paint is generally lower than 60 mass %.

(8) The manufacturing method can further include, after the forming step, an arrangement step of arranging the negative electrode composite material layer on a negative electrode collector core material and a drying step of drying the negative electrode composite material layer.

Advantageous Effects of Invention

According to the above, a non-aqueous electrolytic secondary battery having long life can be provided.

DESCRIPTION OF EMBODIMENTS

Though one embodiment of the present invention (hereinafter denoted as the "present embodiment") will be described hereinafter in detail, the present embodiment is not limited thereto.

<Non-Aqueous Electrolytic Secondary Battery>

Figure 1:
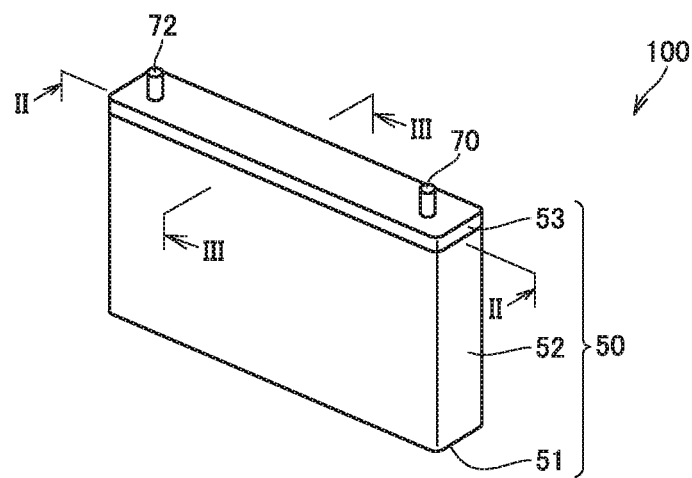
FIG. 1 is a schematic diagram showing one example of a construction of a non-aqueous electrolytic secondary battery according to one embodiment of the present invention.

FIG. 1 is a schematic diagram showing one example of a construction of a non-aqueous electrolytic secondary battery according to the present embodiment. As shown in FIG. 1, a battery 100 is a sealed battery and includes a prismatic case 50. Prismatic case 50 includes a bottom portion 51, a sidewall 52 continuing to bottom portion 51, and a lid 53 continuing to sidewall 52 and located opposite to bottom portion 51. A material for prismatic case 50 is, for example, an aluminum (Al) alloy. Sidewall 52 and lid 53 are joined to each other, for example, through laser welding. Lid 53 is provided with a positive electrode terminal 70 and a negative electrode terminal 72. Prismatic case 50 may further be provided with a liquid injection hole, a safety valve, and a current cut-off mechanism (none of which is shown).

Figure 2:
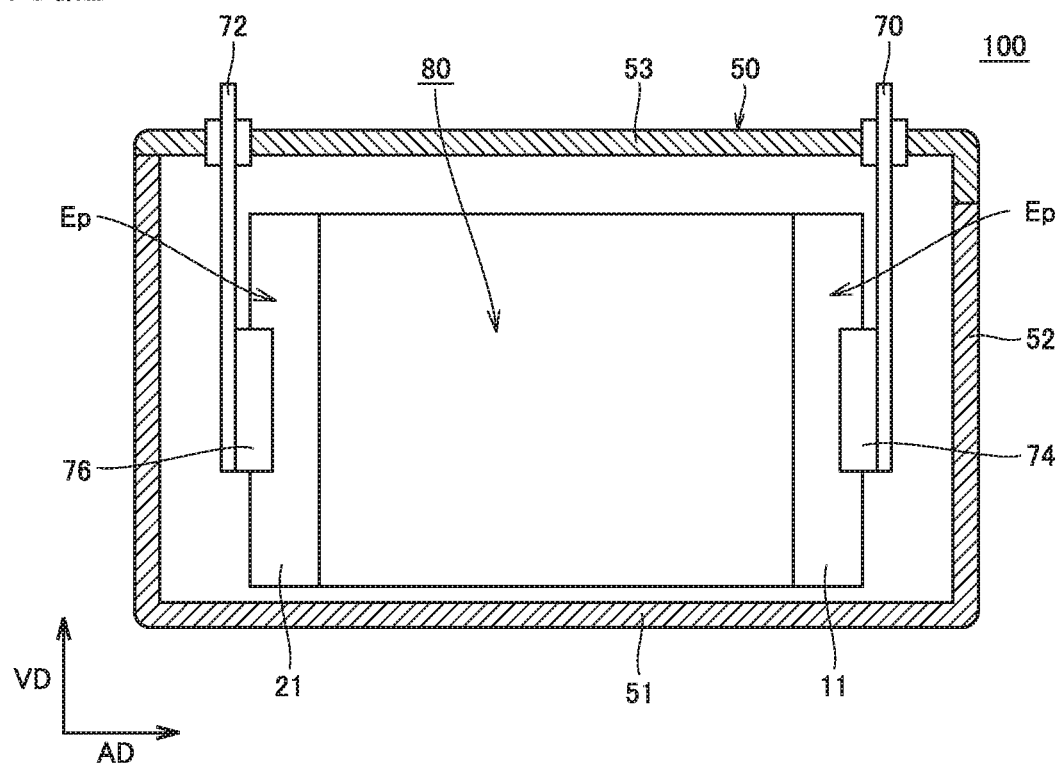
FIG. 2 is a schematic cross-sectional view along the line II-II in FIG. 1.

FIG. 2 is a schematic cross-sectional view of battery 100 along the line II-II in FIG. 1. As shown in FIG. 2, prismatic case 50 contains a flat electrode winding assembly 80 and an electrolyte (not shown). Prismatic case 50 accommodates flat electrode winding assembly 80 such that a direction of axis of winding AD of flat electrode winding assembly 80 intersects with a direction VD (typically, upward in a vertical direction) from bottom portion 51 toward lid 53.

Figure 3:
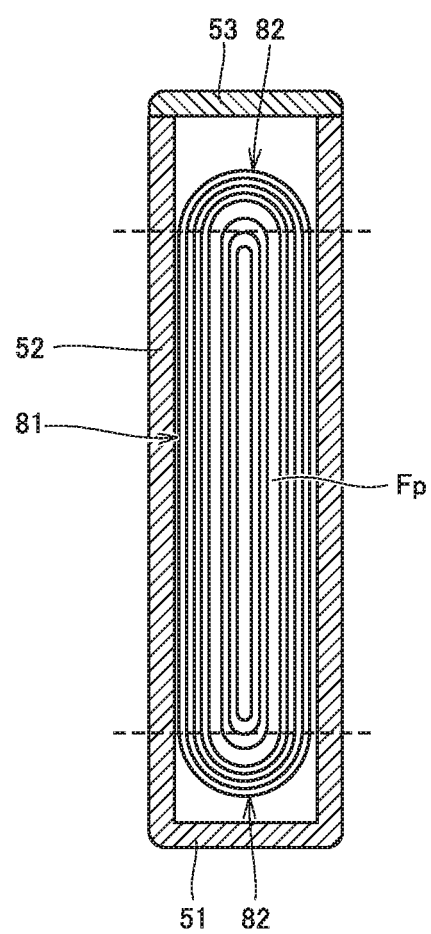
FIG. 3 is a schematic cross-sectional view along the line III-III in FIG. 1.

FIG. 3 is a schematic cross-sectional view of battery 100 along the line III-III in FIG. 1. As shown in FIG. 3, flat electrode winding assembly 80 includes a flat portion 81 obtained by stacking flat-plate portions Fp of a positive electrode composite material layer 12 and a negative electrode composite material layer 22 and a bent portion 82, and flat portion 81 faces sidewall 52 of prismatic case 50.

Description will be given again with reference to FIG. 2. Flat electrode winding assembly 80 has exposed portions Ep where a positive electrode collector core material 11 and a negative electrode collector core material 21 are exposed at both end portions in direction of axis of winding AD. A positive electrode collector plate 74 and a negative electrode collector plate 76 are connected to exposed portions Ep, respectively. Positive electrode collector plate 74 is directly connected to positive electrode terminal 70 and negative electrode collector plate 76 is directly connected to negative electrode terminal 72. Such a structure is also called a tabless structure and particularly suitable for an application in which high-rate charging and discharging is required, because a large area for reaction of an electrode can be secured.

Figure 4:
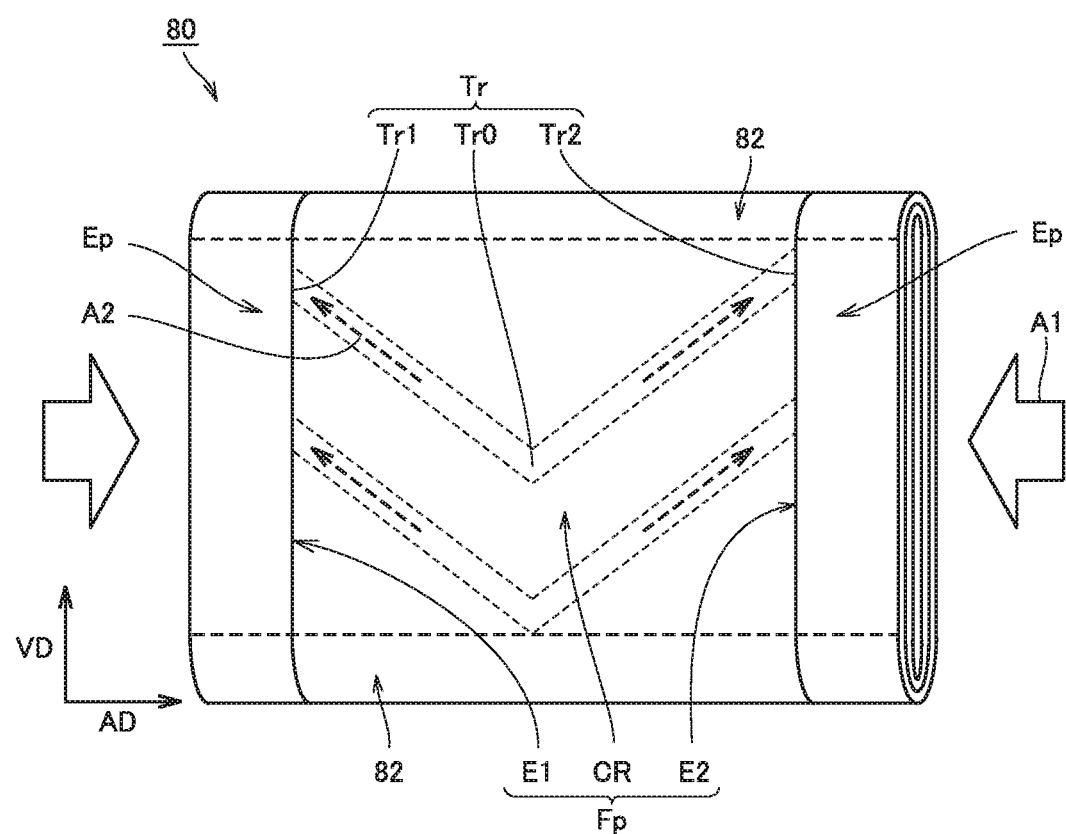
FIG. 4 is a schematic diagram showing one example of a construction of a flat electrode winding assembly according to one embodiment of the present invention.

FIG. 4 is a schematic diagram showing one example of a construction of flat electrode winding assembly 80. As shown in FIG. 4, a plurality of communication grooves Tr are provided in flat-plate portion Fp of negative electrode composite material layer 22. Flat-plate portion Fp includes a first end portion E1 and a second end portion E2 at respective end portions in direction of axis of winding AD, and includes a central portion CR in a region lying between first end portion E1 and second end portion E2. Communication groove Tr includes a starting portion Tr0 in central portion CR, a first terminal end portion Tr1 at first end portion E1, and a second terminal end portion Tr2 at second end portion E2, and extends from starting portion Tr0 to first terminal end portion Tr1 and second terminal end portions Tr2. Starting portion Tr0 among starting portion Tr0, first terminal end portion Tr1, and second terminal end portion Tr2 is located closest to bottom portion 51 in direction VD from bottom portion 51 toward lid 53.

Figure 5:
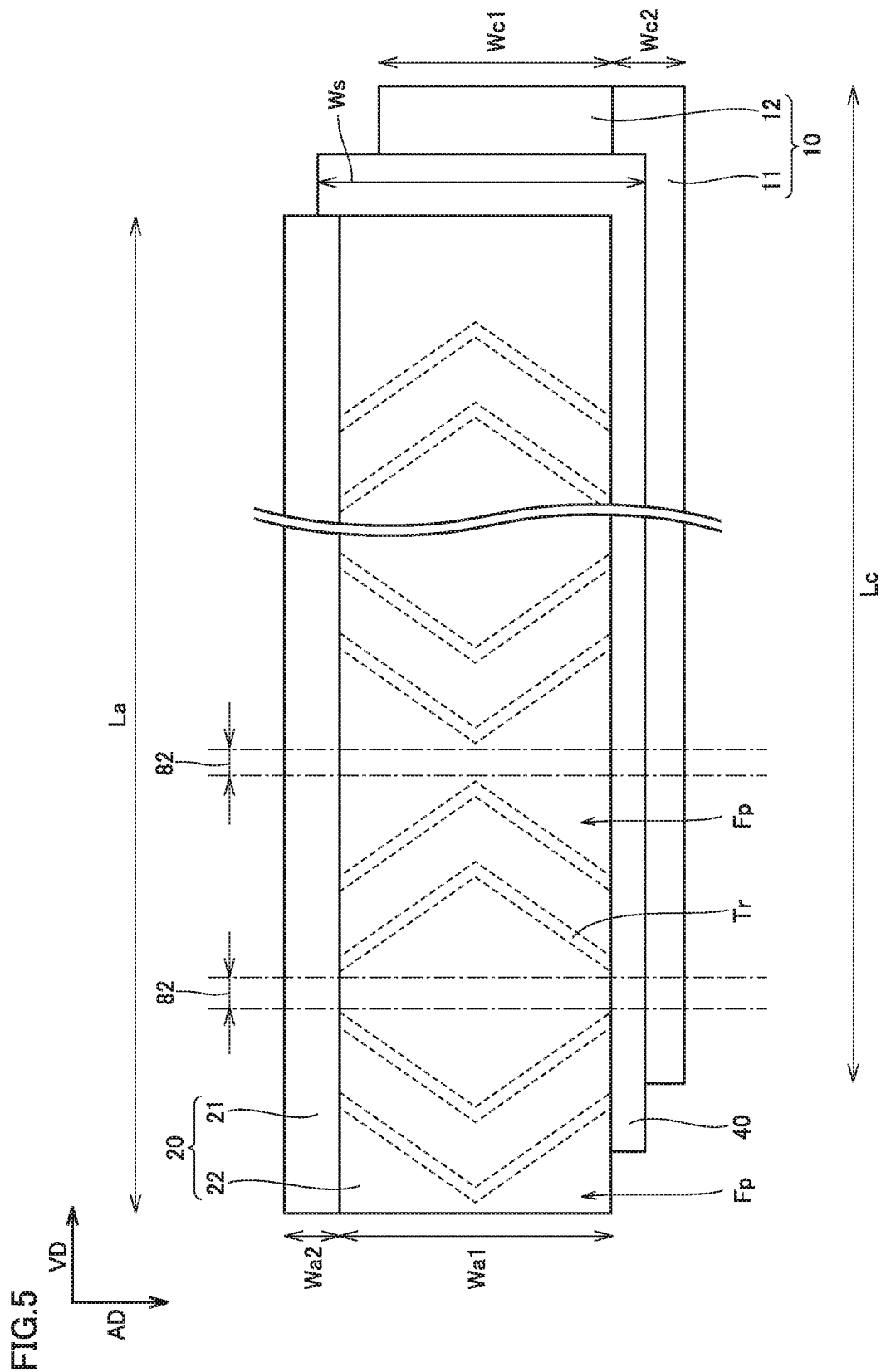
FIG. 5 is a schematic developed view showing one example of the construction of the flat electrode winding assembly according to one embodiment of the present invention.

FIG. 5 is a schematic developed view showing one example of the construction of flat electrode winding assembly 80. As shown in FIG. 5, flat electrode winding assembly 80 includes a negative electrode 20, a separator 40, and a positive electrode 10, all of which are in an elongated shape, and is formed by winding negative electrode 20 and positive electrode 10 along a longitudinal direction with separator 40 being interposed therebetween. A portion of negative electrode composite material layer 22 to be flat-plate portion Fp is provided with a plurality of communication grooves Tr. Communication groove Tr is patterned in line symmetry, with a portion to form bent portion 82 after winding being interposed. Thus, after winding, in each flat-plate portion Fp, starting portion Tr0 of communication groove Tr is always located closer to bottom portion 51 relative to first terminal end portion Tr1 and second terminal end portion Tr2.

Description will be given again with reference to FIG. 4. An arrow A1 in FIG. 4 indicates a direction in which an electrolyte flows in during impregnation of flat electrode winding assembly 80 with the electrolyte. In order to have the electrolyte reach the inside of flat electrode winding assembly 80, a gas contained in flat electrode winding assembly 80 and the electrolyte should be substituted with each other. In the present embodiment, communication groove Tr functions as a path through which a gas is released and the gas is removed along an arrow A2 in FIG. 4, and hence impregnation of central portion CR with the electrolyte is easy. In addition, since the gas is readily removed, a rate of impregnation also naturally increases.

During high-rate charging and discharging, normally, the electrolyte is pushed from central portion CR toward first end portion E1 and second end portion E2. Since communication groove Tr is provided, movement of the electrolyte is restricted and distribution of the electrolyte is less likely to be uneven. Even when distribution of the electrolyte is partially uneven, the electrolyte can move along communication groove Tr from first end portion E1 and second end portion E2 toward central portion CR, and hence unevenness of the electrolyte can be overcome. Therefore, battery 100 can exhibit long life. Each member forming battery 100 will be described below.

<Negative Electrode>

Figure 6:
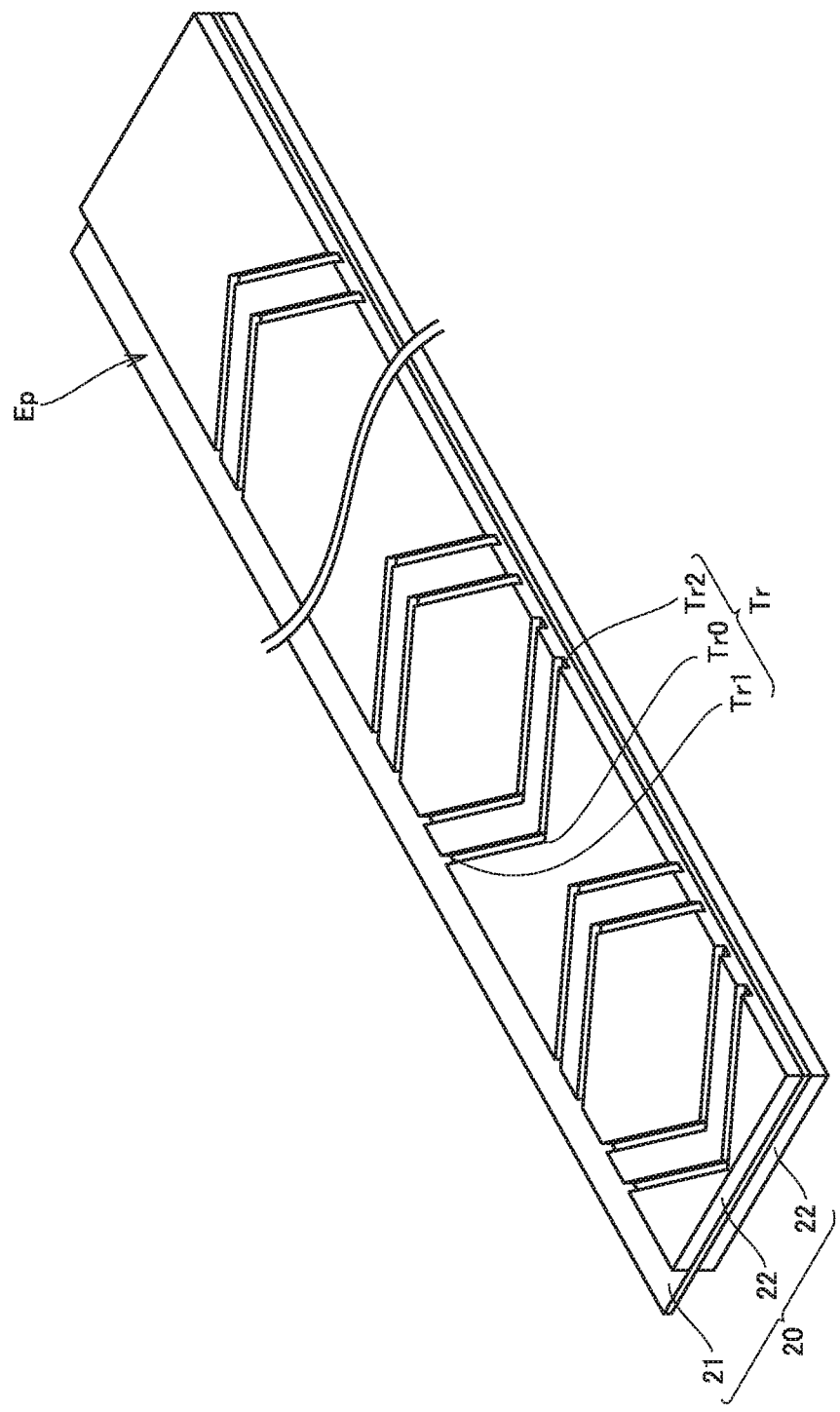
FIG. 6 is a schematic diagram showing one example of a construction of a negative electrode according to one embodiment of the present invention.

FIG. 6 is a schematic diagram showing one example of a construction of negative electrode 20. As shown in FIG. 6, negative electrode 20 includes negative electrode collector core material 21 in an elongated shape and negative electrode composite material layer 22 in an elongated shape formed on each of both main surfaces. Negative electrode collector core material 21 is formed, for example, from a copper (Cu) foil.

<Negative Electrode Composite Material Layer>

Negative electrode composite material layer 22 is a composite material layer obtained from a granule and has a plurality of communication grooves Tr in a surface. Communication groove Tr opens toward respective side surfaces of negative electrode composite material layer 22 at first terminal end portion Tr1 and second terminal end portion Tr2 and functions as a gas outlet.

<Communication Groove>

Figure 8:
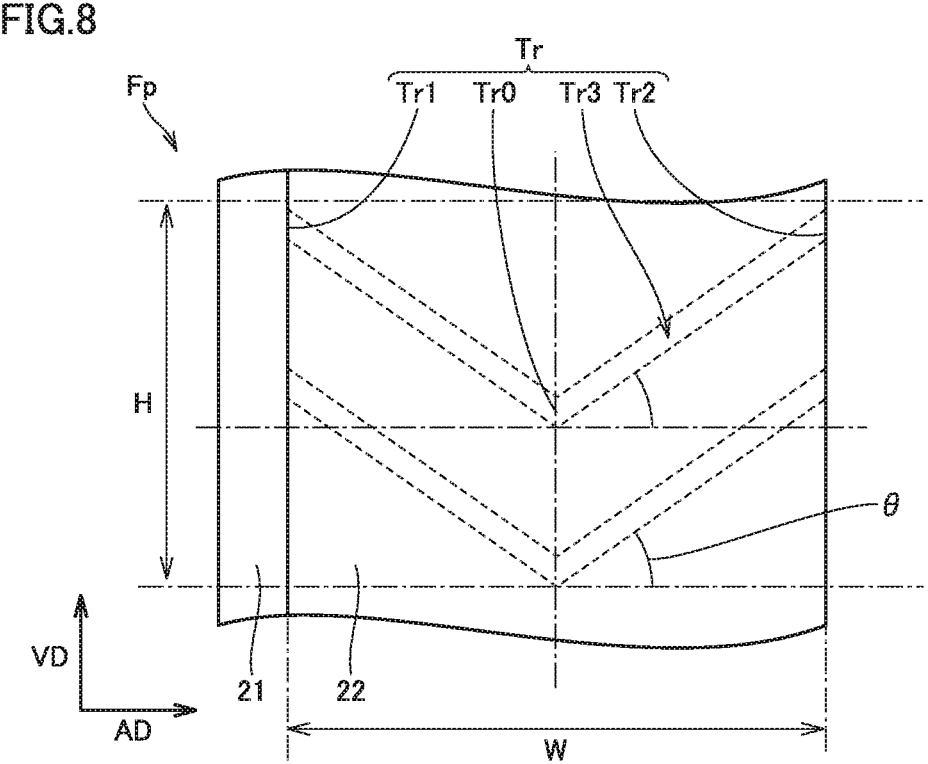
FIG. 8 is a schematic plan view showing one example of a communication groove according to one embodiment of the present invention.

FIG. 8 shows communication groove Tr extending in a V shape in flat-plate portion Fp. By thus adopting a line symmetric shape with respect to a straight line passing through starting portion Tr0 and extending in direction VD intersecting with direction of axis of winding AD, efficiency in gas emission is improved. When communication groove Tr extends in the V shape, an angle θ formed between an inclined portion Tr3 extending from starting portion Tr0 toward first terminal end portion Tr1 or second terminal end portion Tr2 and direction of axis of winding AD preferably simultaneously satisfies the following expressions (i) and (ii):

$$1° < θ \times n < 90° \quad \text{(i); and}$$

$$\text{Tan}(θ \times n) = 2H/W \quad \text{(ii).}$$

where "n" represents the number of communication grooves Tr in one flat-plate portion Fp, "W" represents a dimension in direction of axis of winding AD of flat-plate portion Fp, and "H" represents a dimension in direction VD (a direction intersecting with direction of axis of winding AD) from bottom portion 51 toward lid 53. The number n of communication grooves Tr included in one flat-plate portion Fp is preferably not smaller than 1 and not greater than 50. By satisfying such relation, a plurality of communication grooves Tr can efficiently be arranged in flat-plate portion Fp and efficiency in gas emission can further be enhanced.

Figure 9:
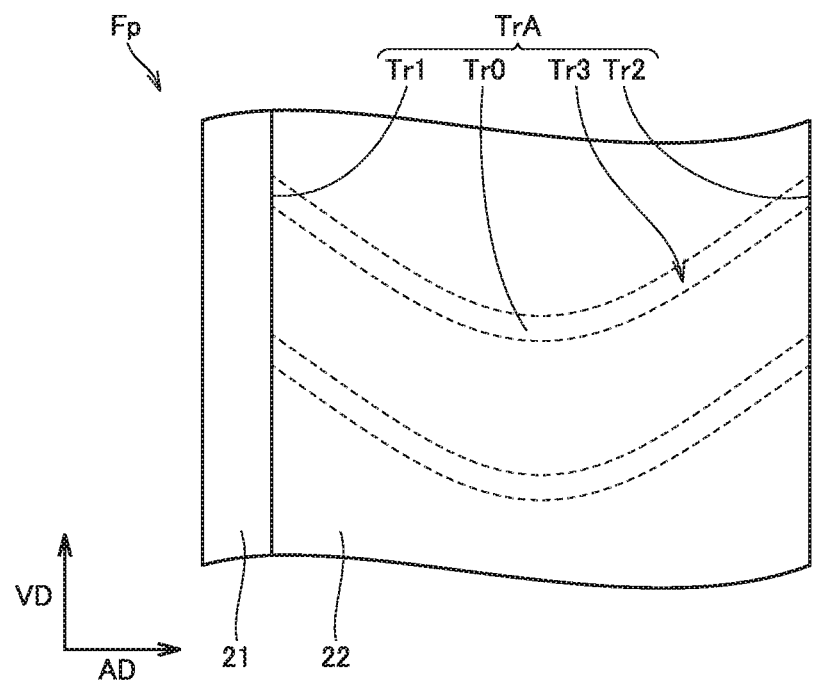
FIG. 9 is a schematic plan view showing a first modification of the communication groove.
Figure 10:
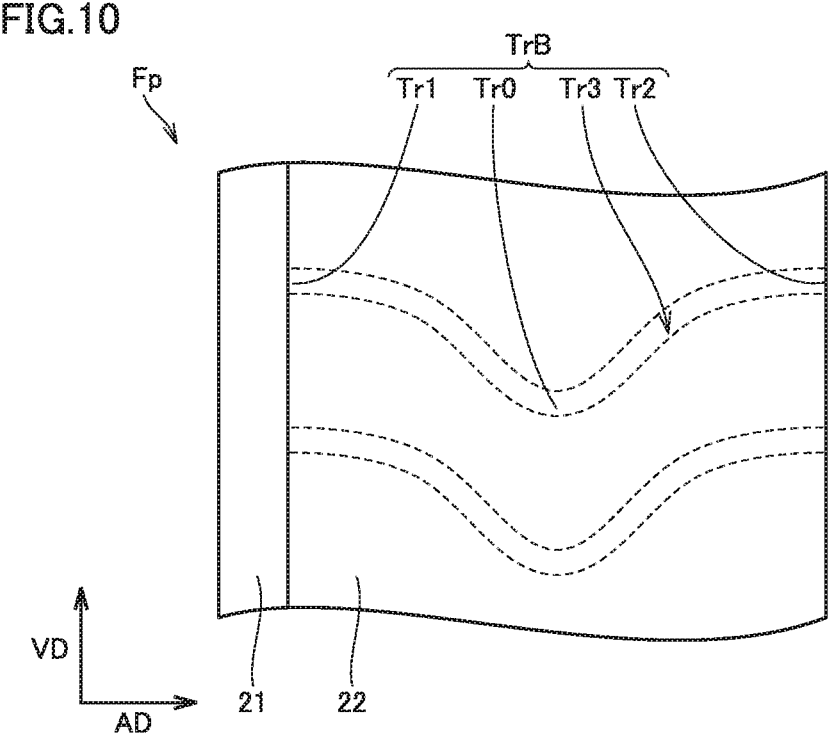
FIG. 10 is a schematic plan view showing a second modification of the communication groove.
Figure 11:
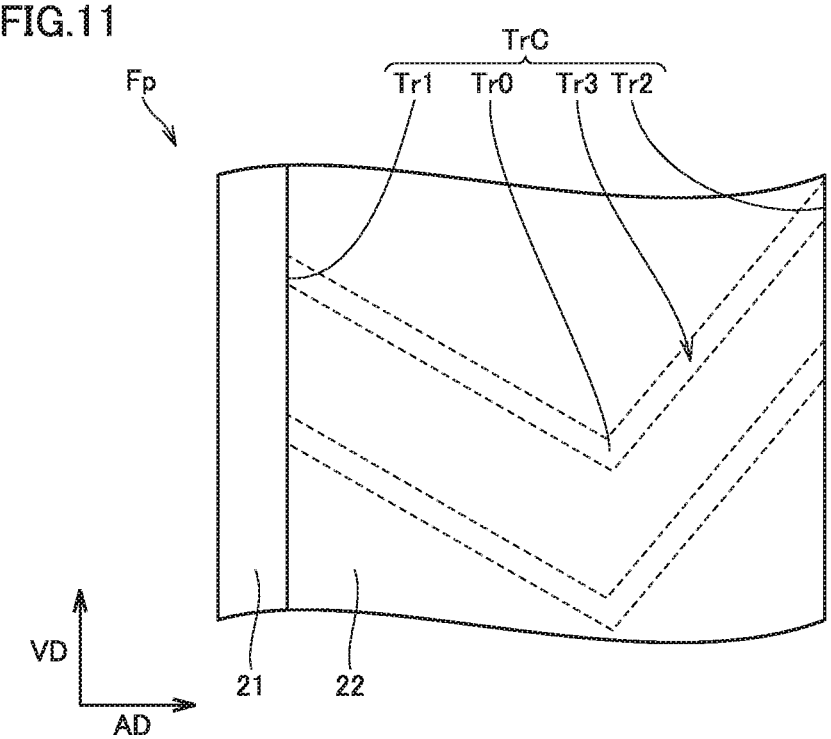
FIG. 11 is a schematic plan view showing a third modification of the communication groove.
Figure 12:
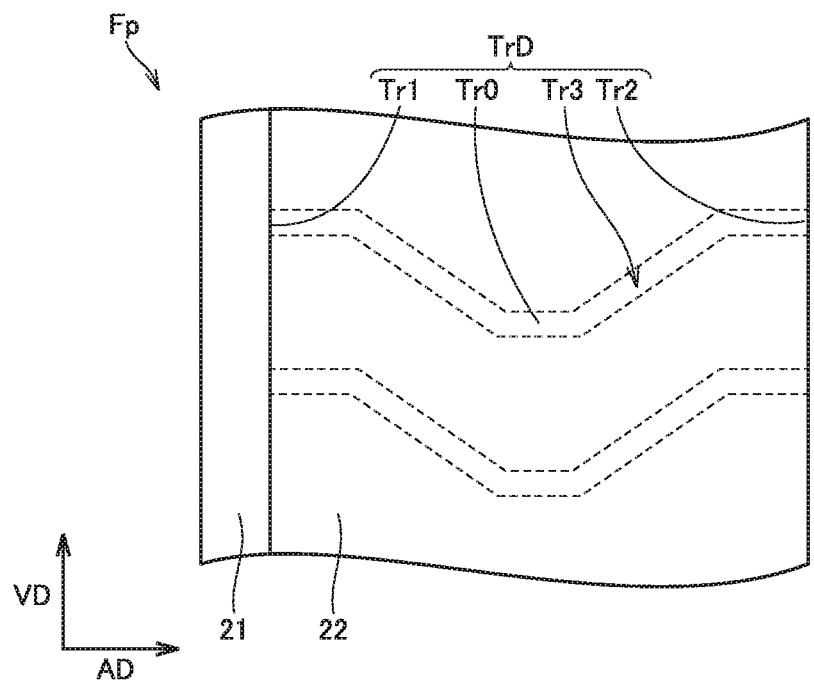
FIG. 12 is a schematic plan view showing a fourth modification of the communication groove.

A shape of communication groove Tr in flat-plate portion Fp is not limited to the V shape. Communication groove Tr may be in any shape so long as starting portion Tr0 is located closer to bottom portion 51 relative to first terminal end portion Tr1 and second terminal end portion Tr2. For example, the shape of the communication groove may be in a parabolic shape as shown with TrA in FIG. 9 or inclined portion Tr3 may be curved as shown with TrB in FIG. 10. Alternatively, the shape of the communication groove does not have to be line symmetric with respect to the straight line passing through starting portion Tr0 as shown with TrC in FIG. 11. Furthermore, there may be a portion not inclined with respect to direction of axis of winding AD, around starting portion Tr0, first terminal end portion Tr1, and second terminal end portion Tr2, as shown with TrD in FIG. 12.

Figure 13:
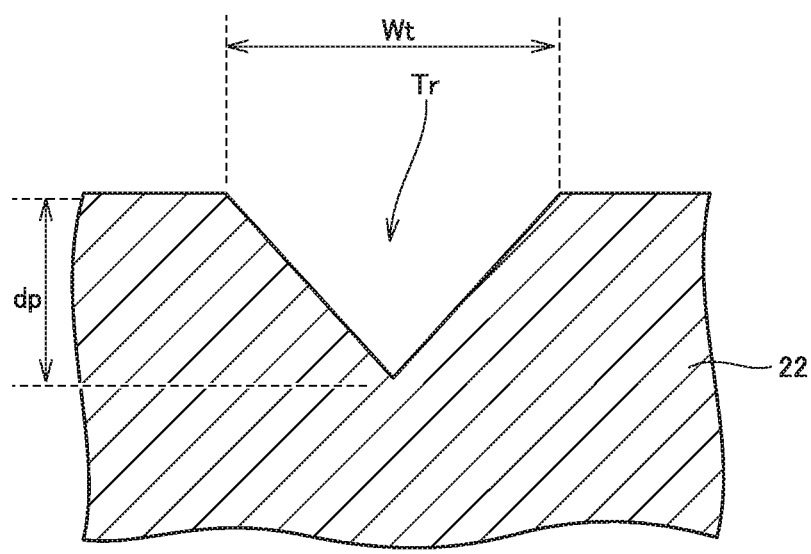
FIG. 13 is a schematic cross-sectional view showing one example of a cross-sectional shape of the communication groove.
Figure 14:
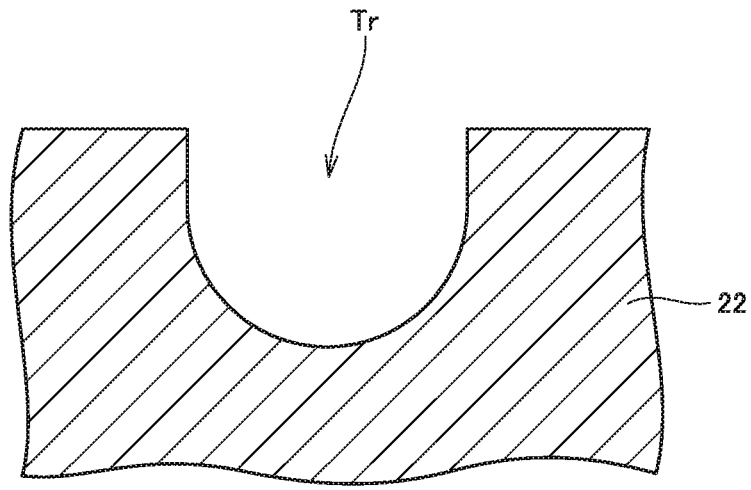
FIG. 14 is a schematic cross-sectional view showing a first modification of the cross-sectional shape of the communication groove.
Figure 15:
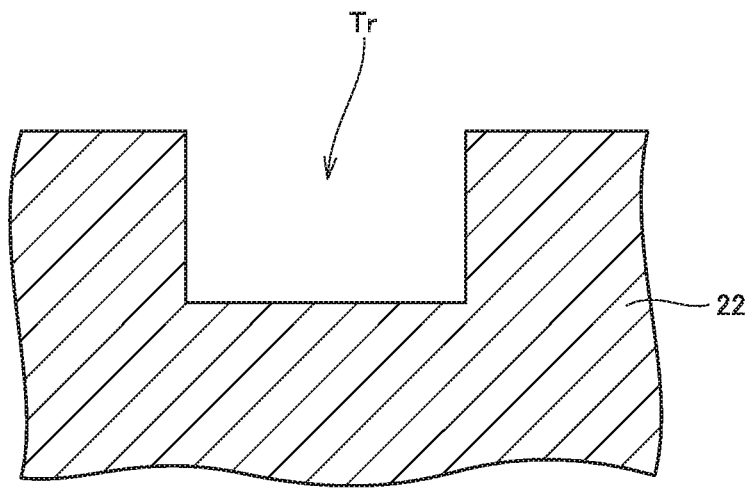
FIG. 15 is a schematic cross-sectional view showing a second modification of the cross-sectional shape of the communication groove.

A cross-sectional shape of communication groove Tr is not particularly limited either. FIGS. 13, 14, and 15 are schematic cross-sectional views each showing a cross-sectional shape of communication groove Tr. In each figure, a direction of normal to the sheet surface corresponds to a direction of extension of communication groove Tr. A cross-sectional shape of communication groove Tr may be in a V shape shown in FIG. 13 (that is, a V-shaped groove) or in a U shape shown in FIG. 14, or in a bracket shape shown in FIG. 15. In consideration of productivity, however, a cross-section of communication groove Tr is preferably in a V shape. Communication groove Tr shown in FIG. 13 has a width Wt, for example, approximately not smaller than 3 mm and not greater than 30 mm and preferably approximately not smaller than 7 mm and not greater than 10 mm. Communication groove Tr has a depth dp, for example, approximately not smaller than 0.5 μm and not greater than 10 μm and preferably approximately not smaller than 2 μm and not greater than 5 μm.

<Granule>

Negative electrode composite material layer 22 includes a plurality of granules. As negative electrode composite material layer 22 is formed of a granule rather than a paint, as will be described later, communication groove Tr can be formed without local increase in density of the composite material in obtaining negative electrode composite material layer 22 through compression forming. Negative electrode composite material layer 22 desirably has density of the composite material substantially uniform in the in-plane direction. Then, unevenness of electrode reaction is less and life of the battery can be extended. For example, density of the composite material at the bottom of communication groove Tr is desirably at least 0.90 time and at most 1.10 time (more preferably at least 1.00 and at most 1.10 time) as high as density of the composite material in a portion except for communication groove Tr. By forming negative electrode composite material layer 22 from a granule, such substantially uniform density of the composite material can readily be realized. On the other hand, in forming a negative electrode composite material layer from a paint, it is extremely difficult to keep density of the composite material uniform while a communication groove is provided, because a communication groove can be formed only after the paint is dried, and a negative electrode composite material does not exhibit fluidity after it is dried. Density of the composite material in a portion of negative electrode composite material layer 22 except for communication groove Tr is, for example, approximately not lower than 0.8 g/cm$^3$ and not higher than 1.6 g/cm$^3$ and a thickness of that portion is, for example, approximately not smaller than 50 μm and not greater than 100 μm.

Figure 16:
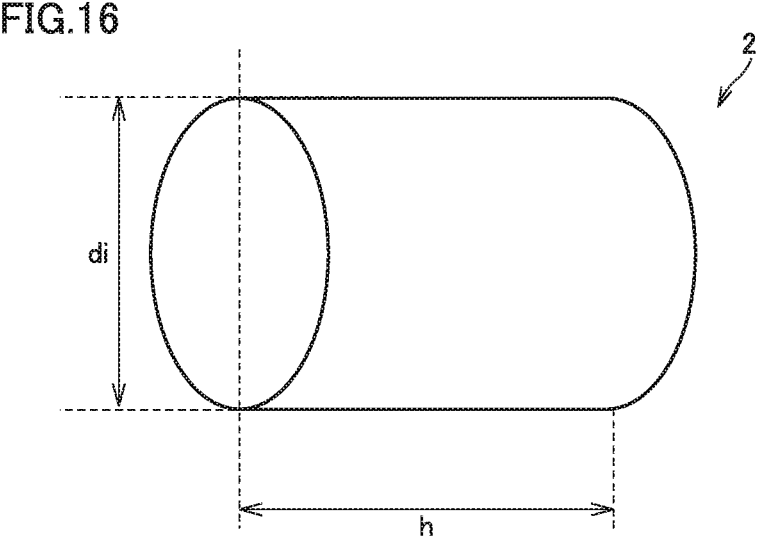
FIG. 16 is a schematic diagram showing one example of a granule according to one embodiment of the present invention.

The granule contains a negative electrode active material, a thickener, and a binder. Though a shape of the granule is not particularly limited, it is desirably columnar, because such a shape is excellent in ease in filling. FIG. 16 is a schematic diagram showing a columnar granule. A granule 2 has a diameter di preferably approximately not smaller than 0.5 mm and not greater than 2.0 mm and a height h preferably approximately at least 1.0 time and at most 3.0 times as large as diameter di. Granule 2 can be manufactured, for example, through extrusion granulation.

A ratio occupied by the negative electrode active material in the granule is, for example, approximately, not lower than 90 mass % and not higher than 99.5 mass %, preferably not lower than 95 mass % and not higher than 99.5 mass %, and more preferably not lower than 97 mass % and not higher than 99.5 mass %. A negative electrode active material is not particularly limited, and it should only be able to function as a negative electrode active material for a non-aqueous electrolytic secondary battery. For example, a carbon-based negative electrode active material such as graphite and coke or an alloy-based negative electrode active material such as silicon (Si) and tin (Sn) can be employed.

A thickener and a binder are not particularly limited either. For example, carboxymethylcellulose (CMC) or polyvinyl alcohol (PVA) can be employed as the thickener. For example, styrene-butadiene rubber (SBR), acrylic rubber (AR), urethane rubber, or polytetrafluoroethylene (PTFE) can be employed as the binder. A ratio occupied by the thickener and the binder in the granule is, for example, approximately not lower than 0.5 mass % and not higher than 10 mass %, preferably not lower than 0.5 mass % and not higher than 5 mass %, and more preferably not lower than 0.5 mass % and not higher than 3 mass %.

Whether or not the negative electrode composite material layer is obtained from a granule can readily be determined by observing a surface or a cross-section in a direction of thickness of the negative electrode composite material layer with an optical microscope or an electron microscope (SEM). Alternatively, a negative electrode composite material layer obtained from a granule and a negative electrode composite material layer obtained from a paint can be distinguished from each other also based on a migration index of the binder.

The "migration index" refers to an index representing distribution of a binder in a direction of thickness of a negative electrode composite material layer and can be found as follows. When a negative electrode composite material layer contains a binder containing carbon-carbon double bond (such as SBR), the binder is dyed, for example, with osmium tetroxide ($OsO_4$) or the like. Then, a cross-section in the direction of thickness of the negative electrode composite material layer is obtained and the cross-section is cleaned with a cross-section polisher (CP) or the like. The cleaned cross-section is subjected to elemental analysis (area analysis) with the use of an electron probe microanalyzer (EPMA). Here, a dyeing method is not particularly limited and can be modified as appropriate in accordance with a type of a binder to be dyed.

In a cross-section to be analyzed, the negative electrode composite material layer is divided into two in the direction of thickness, that is, into a surface side and a core side. A migration index can be found by measuring an amount of presence of Os (atomic %) on the surface side and an amount of presence of Os on the core side and dividing the amount of presence of Os on the surface side by the amount of presence of Os on the core side. A paint is low in ratio of a solid content and contains a large amount of solvent. Therefore, when the solvent is volatilized, the binder moves together with the solvent toward the surface, and the migration index takes a high value. On the other hand, the granule is high in ratio of a solid content and the binder is less likely to move. Thus, the migration index can be a value close to 1.0. Normally, the negative electrode composite material layer obtained from a paint has a value for a migration index exceeding 1.8, whereas a negative electrode composite material layer obtained from a granule has a migration index not greater than 1.2.

<Positive Electrode>

Figure 7:
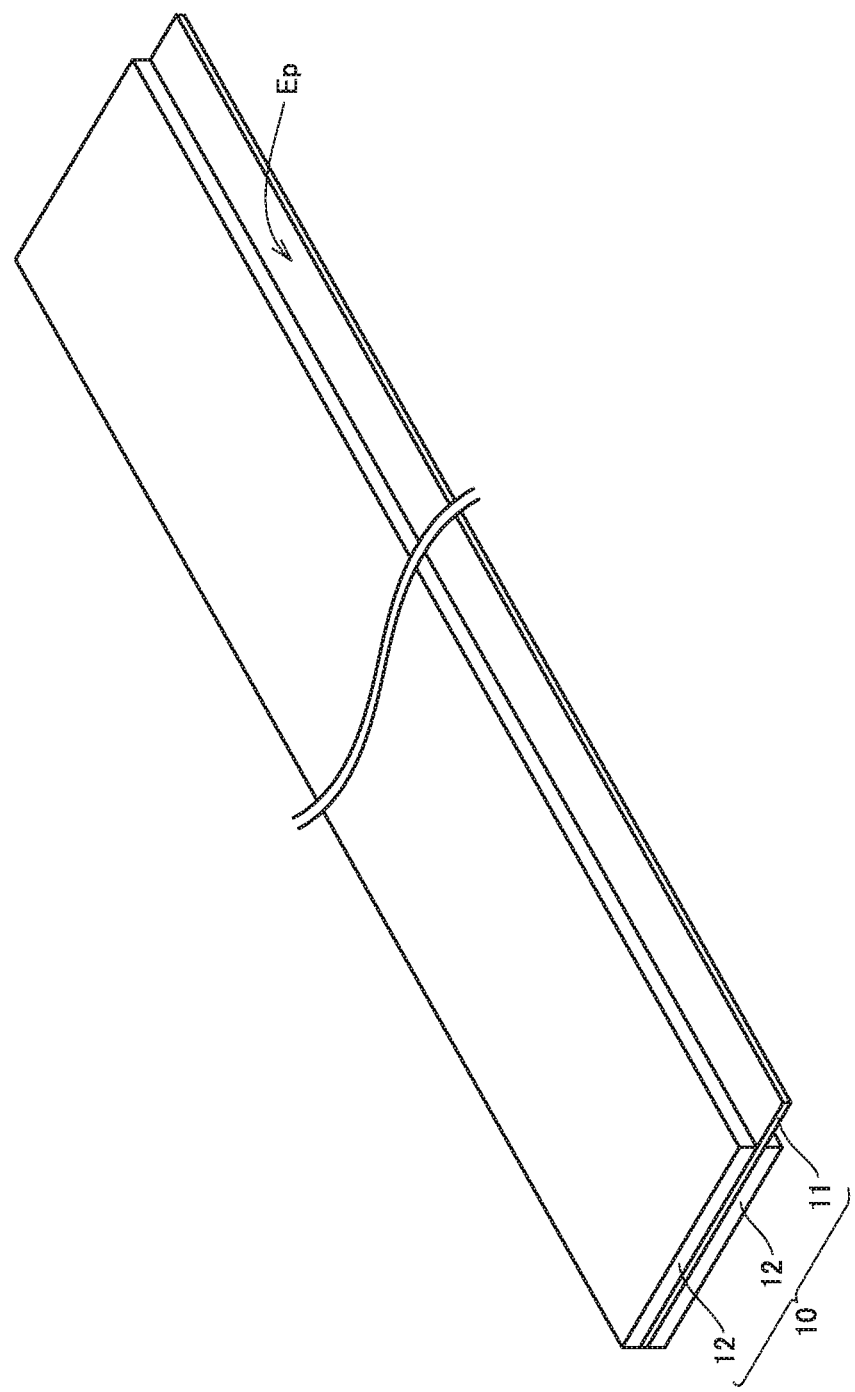
FIG. 7 is a schematic diagram showing one example of a construction of a positive electrode according to one embodiment of the present invention.

FIG. 7 is a schematic diagram showing one example of a construction of positive electrode 10. As shown in FIG. 7, positive electrode 10 includes positive electrode collector core material 11 in an elongated shape and positive electrode composite material layer 12 in an elongated shape formed on each of both main surfaces. Positive electrode collector core material 11 is formed, for example, from an Al foil. Positive electrode composite material layer 12 has a thickness, for example, approximately not smaller than 50 μm and not greater than 100 μm and density of the composite material, for example, approximately not lower than 1.5 g/cm$^3$ and not higher than 3.0 g/cm$^3$.

Positive electrode composite material layer 12 may be obtained from a paint or a granule. Positive electrode composite material layer 12 can be formed, for example, by coating positive electrode collector core material 11 with a paint containing a positive electrode active material followed by drying.

Positive electrode composite material layer 12 contains a positive electrode active material, a conductive material, and a binder. The positive electrode active material is not particularly limited and it should only be able to function as a positive electrode active material for a non-aqueous electrolytic secondary battery. For example, $LiCoO_2$, $LiNiO_2$, $LiNi_aCo_bO_2$ (a+b=1, 0<a<1, 0<b<1), $LiMnO_2$, $LiMn_2O_4$, $LiNi_aCo_bMn_cO_2$ (a+b+c=1, 0<a<1, 0<b<1, 0<c<1), and $LiFePO_4$ can be employed. A ratio occupied by the positive electrode active material in positive electrode composite material layer 12 is, for example, approximately from 80 to 98 mass %.

For example, acetylene black (AB) or graphite can be employed as the conductive material. A ratio occupied by the conductive material in positive electrode composite material layer 12 is, for example, approximately from 1 to 10 mass %. For example, polyvinylidene difluoride (PVDF) or PTFE can be employed as the binder. A ratio of the binder in positive electrode composite material layer 12 is, for example, approximately from 1 to 10 mass %.

<Separator>

Separator 40 prevents electrical contact between positive electrode 10 and negative electrode 20 while it allows permeation of Li ions. Separator 40 is preferably formed from a microporous film made of a polyolefin-based material, from a point of view of mechanical strength and chemical stability. A microporous film, for example, of polyethylene (PE) or polypropylene (PP) is suitable.

Separator 40 may be formed by layering a plurality of microporous films, and it may have a heat-resistant layer containing an inorganic filler (such as alumina particles) formed on its surface. Separator 40 has a thickness, for example, approximately from 5 to 40 μm. A pore diameter and a porosity of separator 40 are desirably adjusted as appropriate such that air permeability attains to a desired value.

<Electrolyte>

An electrolyte is an electrolytic solution obtained by dissolving Li salt (supporting salt) in an aprotic solvent. As the aprotic solvent, for example, cyclic carbonates such as ethylene carbonate (EC), propylene carbonate (PC), butylene carbonate (BC), and γ-butyrolactone (γBL) and chain carbonates such as dimethyl carbonate (DMC), ethyl methyl carbonate (EMC), and diethyl carbonate (DEC) can be employed. Two or more of these aprotic solvents are desirably used together, from a point of view of electrical conductivity and electrochemical stability. In particular, cyclic carbonate and chain carbonate are desirably used as being mixed, and in that case, a volume ratio between the cyclic carbonate and the chain carbonate is preferably approximately from 1:9 to 5:5.

As Li salt, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide [$Li(CF_3SO_2)_2N$], or lithium trifluoromethanesulfonate ($LiCF_3SO_3$) can be employed. Two or more of these Li salts may also be used together. Though a concentration of Li salt in the electrolyte is not particularly limited, from a point of view of life of the battery, the concentration is preferably approximately from 0.5 to 2.0 mol/L.

The electrolyte further contains an additive which can form a coating inhibiting growth of SEI. Such an additive can include, for example, Li salts having as anion, such an oxalate complex as lithium bis(oxalate)borate [$LiB(C_2O_4)_2$; "LiBOB"], lithium difluoro(oxalate)borate [$LiBF_2(C_2O_4)$], and lithium difluorobis(oxalate)phosphate [$LiPF_2(C_2O_4)_2$], as well as lithium difluorophosphate ($LiPO_2F_2$), vinylene carbonate (VC), vinyl ethylene carbonate (VEC), fluoroethylene carbonate (FEC), ethylene sulfite (ES), and propane sultone (PS). Among these, LiBOB, VC, VEC, FEC, and $LiPO_2F_2$ are particularly preferred. Namely, the electrolyte preferably contains at least one selected from the group consisting of LiBOB, VC, VEC, FEC, and $LiPO_2F_2$. An amount of addition of an additive is preferably approximately not lower than 0.5 mass % and not higher than 2.0 mass % with respect to the total mass of the electrolyte.

The electrolyte may further contain an overcharge additive promoting increase in internal pressure at the time of overcharge. For example, cyclohexylbenzene (CHB), biphenyl (BP), biphenylether (BPE), tert-butylbenzene (TBB), or tert-amylbenzene (TAB) represents an example of the overcharge additive. A coating may contain a component derived from an overcharge additive.

<Method of Manufacturing Non-Aqueous Electrolytic Secondary Battery>

The non-aqueous electrolytic secondary battery in the present embodiment described above can be manufactured with a method as follows.

Figure 17:
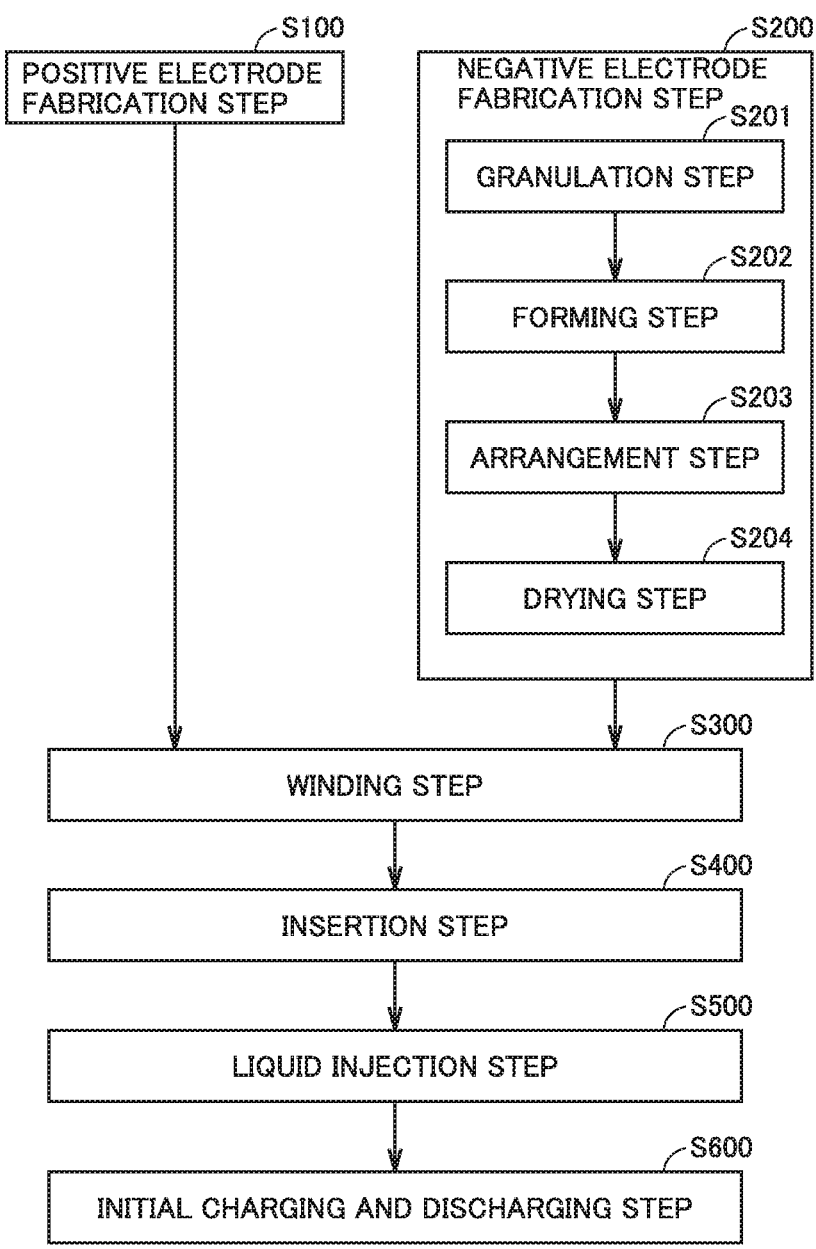
FIG. 17 is a flowchart showing overview of a method of manufacturing a non-aqueous electrolytic secondary battery according to one embodiment of the present invention.

FIG. 17 is a flowchart showing overview of a method of manufacturing a non-aqueous electrolytic secondary battery according to the present embodiment. As shown in FIG. 17, the manufacturing method includes a positive electrode fabrication step (S100), a negative electrode fabrication step (S200), a winding step (S300), an insertion step (S400), a liquid injection step (S500), and an initial charging and discharging step (S600). Among these, the negative electrode fabrication step (S200) includes a granulation step (S201), a forming step (S202), an arrangement step (S203), and a drying step (S204). Each step will be described below.

<Positive Electrode Fabrication Step (S100)>

In the positive electrode fabrication step (S100), positive electrode 10 shown in FIG. 7 is fabricated. For example, positive electrode composite material layer 12 is desirably formed by mixing and kneading a positive electrode active material, a conductive material, and a binder in N-methylpyrrolidone (NMP) to thereby obtain a positive electrode paint and coating a prescribed position on positive electrode collector core material 11 with the positive electrode paint with the use of a die coater followed by drying. Furthermore, a thickness and density of the composite material of positive electrode composite material layer 12 may be adjusted by using a roller.

<Negative Electrode Fabrication Step (S200)>

In the negative electrode fabrication step (S200), negative electrode 20 shown in FIG. 6 is fabricated.

<Granulation Step (S201)>

In the granulation step (S201), a granule which is a wet powdery and granular material is fabricated. The granule is fabricated by mixing a negative electrode active material, a thickener, a binder, and a solvent to thereby obtain a mixture and granulating the mixture. For example, the mixture can be fabricated by mixing a negative electrode active material, a thickener, and a binder together with water in a mixer. For example, "High Speed Mixer" manufactured by EarthTechnica Co., Ltd. can be employed as the mixer. Here, a ratio of a solid content of the mixture is preferably adjusted such that the mixture is clayey. In consideration of dispersibility of the binder, preferably, the solvent is introduced in a divided manner so as to gradually approach a target ratio of a solid content in a stepwise manner.

A plurality of granules are obtained by granulating the mixture. A granulation technique is not particularly limited. For example, agitation granulation, fluidized-bed granulation, extrusion granulation, compression granulation, and spray granulation can be carried out. Among these, from a point of view of ease in control of a granule to a desired shape, extrusion granulation is particularly preferred. For example, "Inline Cylindrical Granulator" manufactured by EarthTechnica Co., Ltd. is suitable for an extrusion granulator. In a case of extrusion granulation, a shape and a size of a granule can be adjusted based on a die hole in the granulator. For example, when a die hole is annular, a columnar granule can be fabricated. A final ratio of a solid content of a granule is preferably not lower than 65 mass % and not higher than 80 mass %. When a ratio of a solid content is lower than 65 mass %, roll forming may become difficult, and when a ratio of a solid content exceeds 80 mass %, it may also become difficult to keep density of the composite material uniform while a communication groove is formed. A ratio of a solid content of a granule is more preferably not lower than 67 mass % and not higher than 75 mass % and particularly preferably not lower than 68 mass % and not higher than 74 mass %.

<Forming Step (S202)>

In the forming step (S202), negative electrode composite material layer 22 having a plurality of communication grooves Tr in a surface as shown in FIG. 6 is formed.

Figure 18:
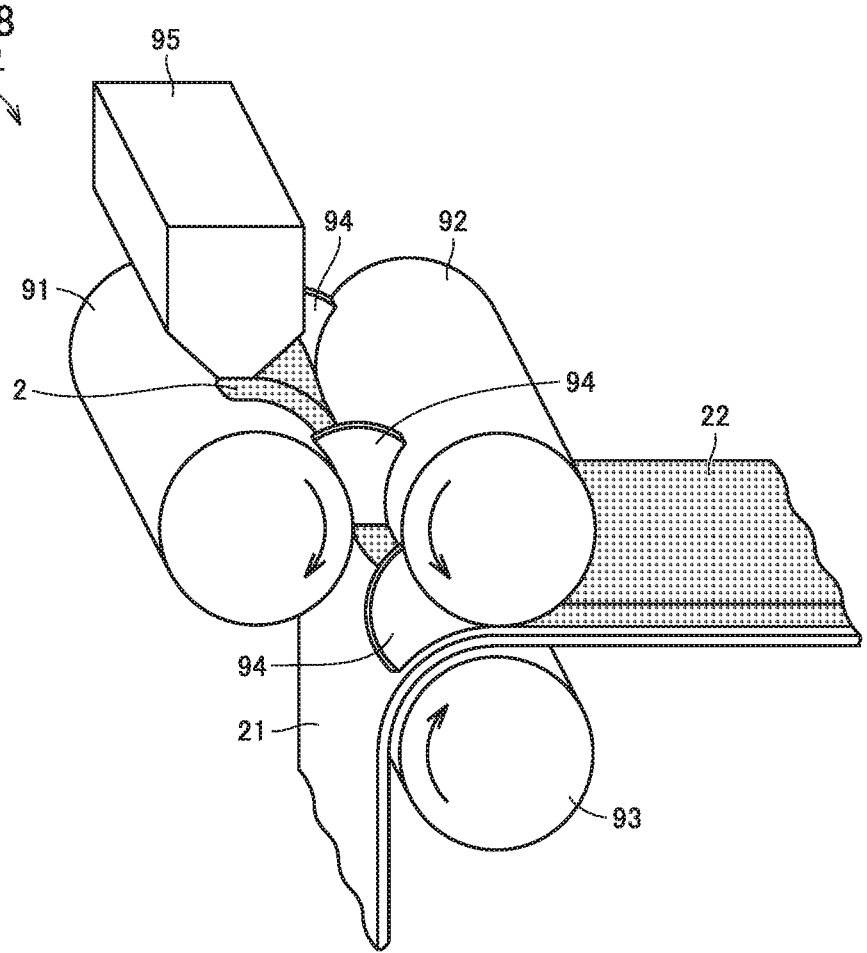
FIG. 18 is a schematic diagram illustrating a forming step and an arrangement step according to one embodiment of the present invention.

FIG. 18 is a schematic diagram illustrating the forming step (S202) and the arrangement step (S203) which will be described later. An operation of a forming and transfer apparatus 90 in FIG. 18 will be described. An arrow in FIG. 18 indicates a direction of rotation of each roll member. A feeder 95 is filled with a plurality of granules. The plurality of granules 2 are supplied from feeder 95 onto an A roll 91 (a second roll). The plurality of granules 2 are transported in a direction shown with the arrow over A roll 91 and reaches a gap between A roll 91 and a B roll 92 (a first roll). In the gap, a pressure is applied to the plurality of granules 2 by A roll 91 and B roll 92, so that the plurality of granules 2 are formed into negative electrode composite material layer 22 in a sheet shape. A width of negative electrode composite material layer 22 (a dimension in direction of axis of winding AD) is adjusted by partition members 94.

Figure 19:
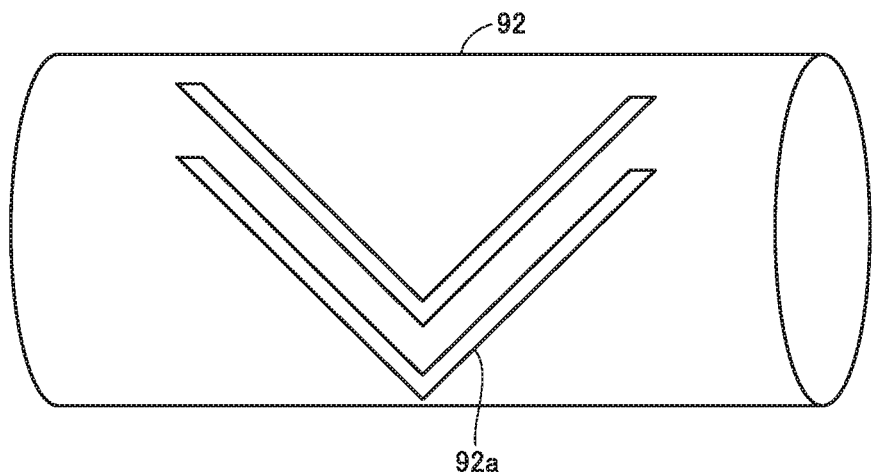
FIG. 19 is a schematic diagram showing one example of a forming roll.

As shown in FIG. 19, a mark 92a (a protrusion) in a shape in conformity with communication groove Tr is provided on a surface of B roll 92. Then, when a plurality of granules 2 pass through the gap between A roll 91 and B roll 92, communication groove Tr is formed in the surface of negative electrode composite material layer 22. Here, granule 2 is in a wet state and exhibits fluidity and flexibility. Therefore, forming is carried out as if granule 2 moved away from a portion pressed against mark 92a and density of the composite material in communication groove Tr and around the same can be finished to be as high as that in other portions.

<Arrangement Step (S203)>

In the arrangement step (S203), negative electrode composite material layer 22 is arranged in a prescribed position on negative electrode collector core material 21. As shown in FIG. 18, negative electrode composite material layer 22 formed in a sheet shape in the forming step (S202) is transported over B roll 92 in a direction shown with an arrow. Negative electrode collector core material 21 is transported over a C roll 93 in a direction shown with an arrow. In a gap between B roll 92 and C roll 93, a pressure is applied to negative electrode composite material layer 22 and negative electrode collector core material 21 by B roll 92 and C roll 93, so that negative electrode composite material layer 22 is transferred from B roll 92 onto negative electrode collector core material 21 and pressure-bonded to negative electrode collector core material 21.

<Drying Step (S204)>

In the drying step (S204), negative electrode composite material layer 22 arranged on negative electrode collector core material 21 is dried. A common drying furnace can be employed for drying. A time period and a temperature for drying should only be adjusted as appropriate in accordance with a ratio of a solid content of a granule and a thickness of negative electrode composite material layer 22. Negative electrode 20 can be fabricated as above.

<Winding Step (S300)>

In the winding step (S300), flat electrode winding assembly 80 is fabricated. Flat electrode winding assembly 80 can be fabricated by obtaining an oval electrode winding assembly by initially winding positive electrode 10 and negative electrode 20 with separator 40 being interposed therebetween and then forming the electrode winding assembly in a flat shape.

<Insertion Step (S400)>

In the insertion step (S400), flat electrode winding assembly 80 is inserted in prismatic case 50. Initially, positive electrode collector plate 74 and negative electrode collector plate 76 are connected to exposed portions Ep located at both end portions in direction of axis of winding AD of flat electrode winding assembly 80, respectively. Then, positive electrode terminal 70 provided in lid 53 of prismatic case 50 and positive electrode collector plate 74 are connected to each other, and negative electrode terminal 72 and negative electrode collector plate 76 are connected to each other. Thereafter, flat electrode winding assembly 80 is inserted in a case including bottom portion 51 and sidewall 52. Sidewall 52 and lid 53 are joined to each other, for example, through laser welding.

<Liquid Injection Step (S500)>

In the liquid injection step (S500), an electrolyte is injected into prismatic case 50 and flat electrode winding assembly 80 is impregnated with the electrolyte. The electrolyte is injected through a liquid injection hole (not shown) provided in prismatic case 50. Thereafter, flat electrode winding assembly 80 is impregnated with the electrolyte.

Here, since communication groove Tr functions as a gas outlet port, substitution between the gas and the electrolyte is promoted, the electrolyte reaches the central portion of flat electrode winding assembly 80, and distribution of the electrolyte over the entire flat electrode winding assembly 80 can be uniform. In addition, since a rate of impregnation is increased, a time period for impregnation can also be shortened.

<Initial Charging and Discharging Step (S600)>

Initial charging and discharging is carried out, for example, in a range approximately from 3.0 V to 4.1 V at a relatively low current value (for example, approximately from 0.1 C to 1.0 C). Thus, a coating inhibiting growth of SEI is formed on a surface of a negative electrode active material. Since the electrolyte is distributed substantially uniformly over the entire flat electrode winding assembly 80 in the present embodiment, unevenness in formation of the coating is also less. Battery 100 exhibiting long life can be manufactured as above. Here, a unit "C" for a current value represents a current value at which a rated capacity of a battery is fully discharged in one hour.

EXAMPLES

Though the present embodiment will be described hereinafter in further detail with reference to Examples, the present embodiment is not limited thereto.

<Fabrication of Non-Aqueous Electrolytic Secondary Battery>

Non-aqueous electrolytic secondary batteries according to specimens Nos. 1 to 8 were fabricated as below. Here, specimens Nos. 1 to 3 correspond to Examples and specimens Nos. 4 to 8 correspond to Comparative Examples.

<Specimen No. 1>

1. Fabrication of Positive Electrode (S100)

A positive electrode paint was obtained by mixing and kneading a positive electrode active material ($LiNi_{1/3}Co_{1/3}Mn_{1/3}O_2$), a conductive material (acetylene black), and a binder (PVDF) in NMP. Positive electrode composite material layer 12 was formed by coating both main surfaces of positive electrode collector core material 11 (an Al foil having a thickness of 20 μm) with the positive electrode paint followed by drying. A mass ratio of a solid content in the positive electrode paint was set to the positive electrode active material:the conductive material:the binder=90:8:2. Thereafter, positive electrode composite material layer 12 was compressed to adjust a thickness.

Here, positive electrode composite material layer 12 shown in FIG. 5 had a length Lc of 4500 mm, a width Wc1 of 94 mm, and a width Wc2 of exposed portion Ep of 16 mm. Positive electrode 10 had a thickness (a total thickness of positive electrode collector core material 11 and positive electrode composite material layer 12) of 170 μm.

2. Fabrication of Negative Electrode (S200)

Materials below were prepared.

Negative electrode active material: graphite powders (having D50 of 20 μm)

Thickener: CMC (a product name "MAC500LC" manufactured by Nippon Paper Industries Co., Ltd.)

Binder solution: dispersion of SBR in water (a product number "C41" manufactured by JSR Corporation)

Solvent: water

Here, "D50" represents a particle size at a cumulative value 50% in particle size distribution obtained with a laser diffraction scattering method.

2-1. Granulation Step (S201)

A negative electrode active material (100 parts by mass), a thickener (1 part by mass), a binder (1 part by mass), and water were introduced in High Speed Mixer (manufactured by EarthTechnica Co., Ltd.). Then, in that apparatus, the number of rotations of agitator blades was set to 300 rpm, the number of rotations of chopper blades was set to 1200 rpm, and mixing was carried out for 5 minutes. Thereafter, water was further added to adjust a ratio of a solid content to 71 mass %, and thus a clayey mixture was obtained. This clayey mixture was introduced into Inline Cylindrical Granulator (manufactured by EarthTechnica Co., Ltd.) having an annular die hole having a diameter of 1 mm, and extrusion granulation was carried out with the number of rotations being set to 2000 rpm. Thus, a plurality of granules (having a diameter di of 1 mm and a height h of 1.5 mm) were obtained.

2-2. Forming Step (S202) and Arrangement Step (S203)

With the use of forming and transfer apparatus 90 shown in FIG. 18, negative electrode composite material layer 22 having communication groove Tr was fabricated and negative electrode composite material layer 22 was pressed against and contacted with both main surfaces of negative electrode collector core material 21 (a Cu foil having a thickness of 14 μm). For specimen No. 1, a B roll having projecting mark 92a shown in FIG. 19 was employed, to thereby achieve a shape of communication groove Tr in flat-plate portion Fp as shown in FIG. 8. In specimen No. 1, the number n of communication grooves Tr included in one flat-plate portion Fp was set to 1. An angle θ formed between inclined portion Tr3 of communication groove Tr and direction of axis of winding AD was set to 55°.

Negative electrode 20 was obtained by drying negative electrode composite material layer 22 and slitting negative electrode composite material layer 22 into a prescribed dimension. Negative electrode composite material layer 22 shown in FIG. 5 had a length La of 4700 mm, a width Wa1 of 106 mm, and a width Wa2 of exposed portion Ep of 13 mm. Negative electrode 20 had a thickness (a total thickness of negative electrode collector core material 21 and negative electrode composite material layer 22) of 150 μm.

3. Winding Step (S300)

A separator base material (having a thickness of 25 μm) obtained by stacking a PP microporous film (a PP film) and a PE microporous film (a PE film) in the order of the PP film/the PE film/the PP film was prepared. Alumina particles (96 parts by mass) representing an inorganic filler, acrylic rubber (4 parts by mass), and a solvent (ion exchange water) were mixed with the use of CLEARMIX (manufactured by M Technique Co., Ltd.) and thus a paint to be a heat resistant layer was obtained. The heat resistant layer was formed by coating the separator base material with the paint with the use of a gravure coater followed by drying. Separator 40 was thus obtained. Separator 40 shown in FIG. 5 had a width Ws of 112 mm.

An oval electrode winding assembly was obtained by opposing positive electrode 10 and negative electrode 20 to each other with separator 40 being interposed therebetween as shown in FIG. 5 and winding the same along a longitudinal direction of each member. Flat electrode winding assembly 80 was obtained by pressing (4 kN/cm$^2$, 2 minutes) this electrode winding assembly with a flat press at a room temperature.

4. Insertion Step (S400)

Positive electrode collector plate 74 and negative electrode collector plate 76 were connected to exposed portions Ep of flat electrode winding assembly 80, respectively. After positive electrode terminal 70 and negative electrode terminal 72 provided in lid 53 of prismatic case 50 were connected to positive electrode collector plate 74 and negative electrode collector plate 76, respectively, as shown in FIG. 2, flat electrode winding assembly 80 was inserted in a case (made of Al) constituted of bottom portion 51 and sidewall 52, and in addition, sidewall 52 and lid 53 were joined to each other.

5. Liquid Injection Step (S500)

An electrolyte having composition of [LiPF$_6$ (1.0 mol/L) EC:DMC:EMC=3:4:3 (volume ratio)] was prepared, and in addition, CHB (1 mass %), BP (1 mass %), and LiBOB (1 mass %) were dissolved therein. The electrolyte (125 g) was introduced through the liquid injection hole provided in lid 53 of prismatic case 50 and flat electrode winding assembly 80 was impregnated with the electrolyte. The liquid injection hole was sealed with a plug (a screw).

6. Initial Charging and Discharging Step (S600)

Charging was carried out at a current value of 1 C until 4.1 V was reached, and thereafter, discharging was carried out at a current value of ⅓ C (one-third C) until 3.0 V was reached. A battery (having a rated capacity of 24 Ah) according to specimen No. 1 was obtained as above.

<Specimen No. 2>

A battery according to specimen No. 2 was obtained similarly to specimen No. 1 except that the number n of communication grooves Tr included in one flat-plate portion Fp of negative electrode composite material layer 22 was set to 2 as shown in FIG. 8 and angle θ formed between inclined portion Tr3 and direction of axis of winding AD was set to 35° by changing a shape of the mark on the B roll in the forming step (S202).

<Specimen No. 3>

A battery according to specimen No. 3 was obtained similarly to specimen No. 1 except that the number n of communication grooves Tr included in one flat-plate portion Fp of negative electrode composite material layer 22 was set to 50 and angle θ formed between inclined portion Tr3 and direction of axis of winding AD was set to 2° by changing a shape of the mark on the B roll in the forming step (S202). Specimens Nos. 1 to 3 each satisfy relation of Tan(θ×n)=2H/W.

<Specimen No. 4>

A battery according to specimen No. 4 was obtained similarly to specimen No. 1 except that no communication groove Tr was provided in negative electrode composite material layer 22.

<Specimen No. 5>

Figure 20:
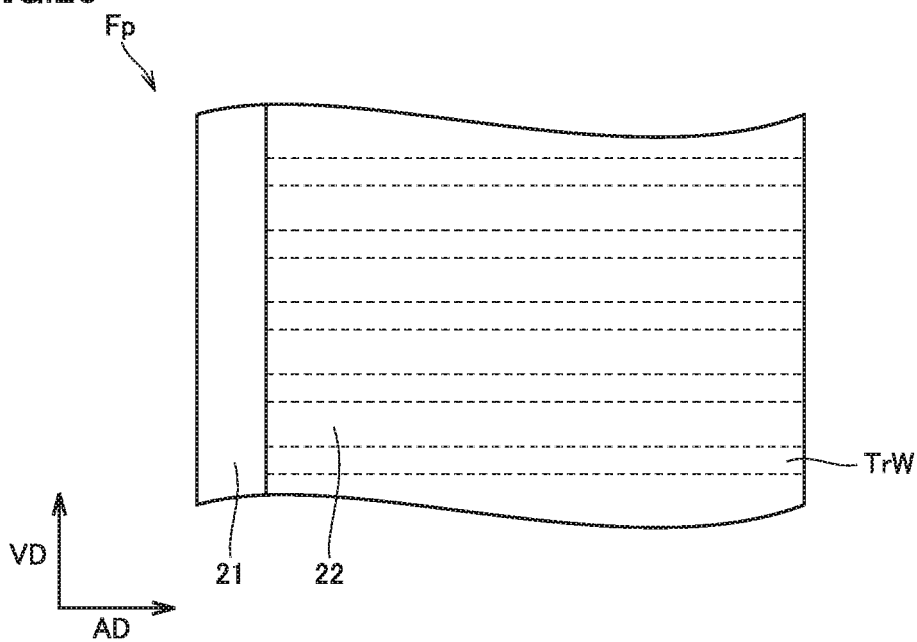
FIG. 20 is a schematic plan view showing a communication groove according to a reference example.

A battery according to specimen No. 5 was obtained similarly to specimen No. 1 except that a communication groove TrW shown in FIG. 20 was formed by changing a shape of the mark on the B roll in the forming step (S202). As shown in FIG. 20, communication groove TrW extends in parallel to direction of axis of winding AD.

<Specimen No. 6>

Figure 21:
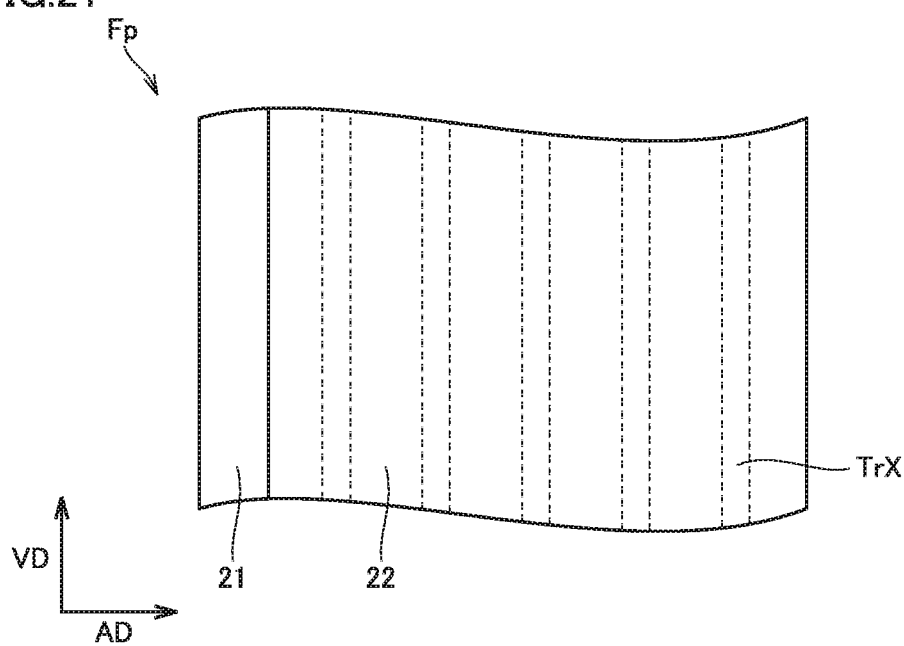
FIG. 21 is a schematic plan view showing a communication groove according to a reference example.

A battery according to specimen No. 6 was obtained similarly to specimen No. 1 except that a communication groove TrX shown in FIG. 21 was formed by changing a shape of the mark on the B roll in the forming step (S202). As shown in FIG. 21, communication groove TrX extends in direction VD intersecting with direction of axis of winding AD.

<Specimen No. 7>

Figure 22:
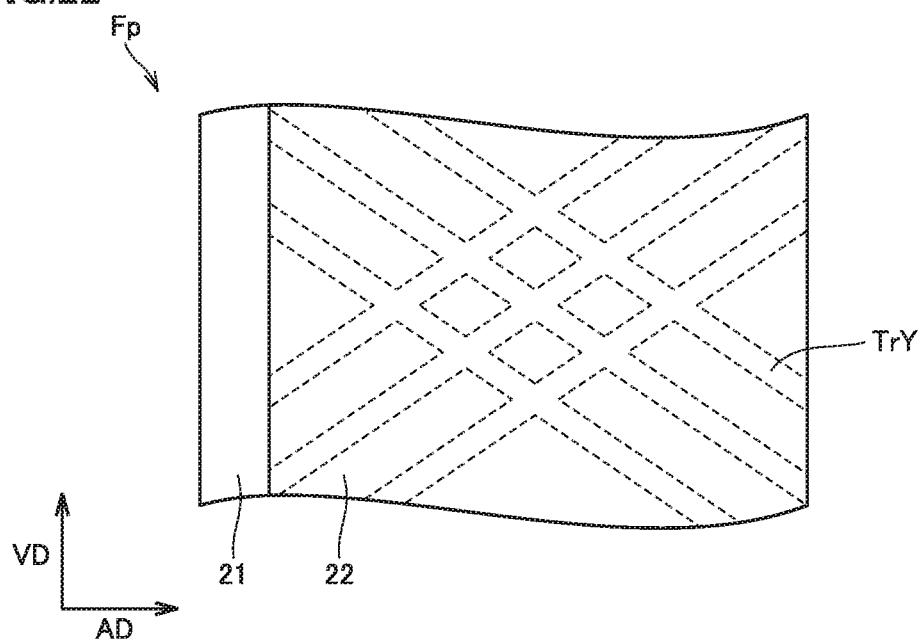
FIG. 22 is a schematic plan view showing a communication groove according to a reference example.

A battery according to specimen No. 7 was obtained similarly to specimen No. 1 except that a communication groove TrY shown in FIG. 22 was formed by changing a shape of the mark on the B roll in the forming step (S202).

As shown in FIG. 22, communication groove TrY has such a structure that inclined portions intersect with each other, however, no starting portion located closest to bottom portion 51 is present.

<Specimen No. 8>

Figure 23:
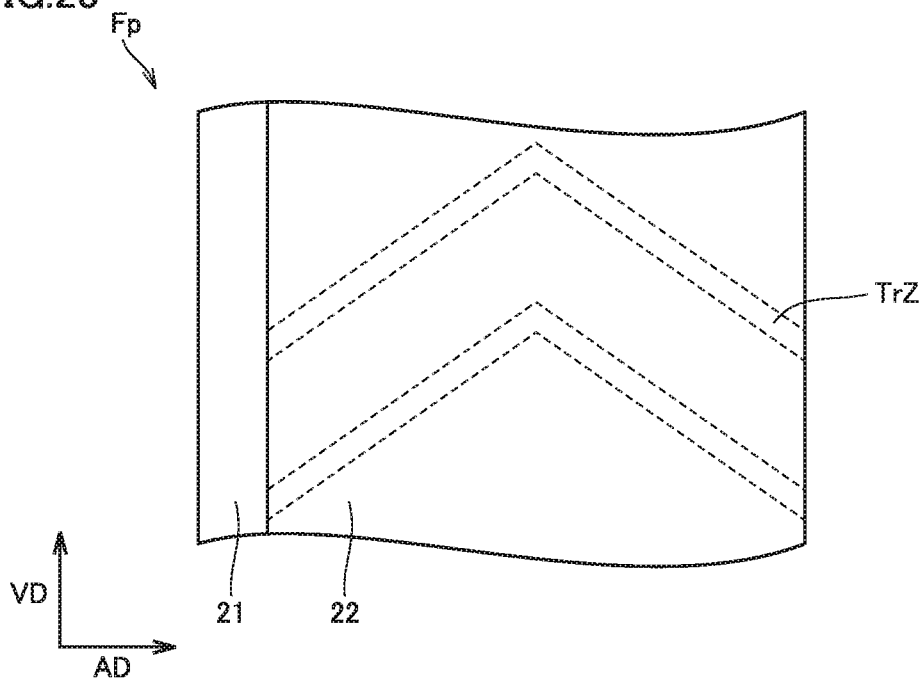
FIG. 23 is a schematic plan view showing a communication groove according to a reference example.

A battery according to specimen No. 8 was obtained similarly to specimen No. 1 except that a communication groove TrZ shown in FIG. 23 was formed by changing a shape of the mark on the B roll in the forming step (S202). As shown in FIG. 23, in communication groove TrZ, the inclined portion extends downward in a vertical direction and angle θ formed between the inclined portion and direction of axis of winding AD was set to −50°.

<Evaluation>

Each battery was evaluated as follows.

1. Evaluation of Uniformity of Coating

Figure 24:
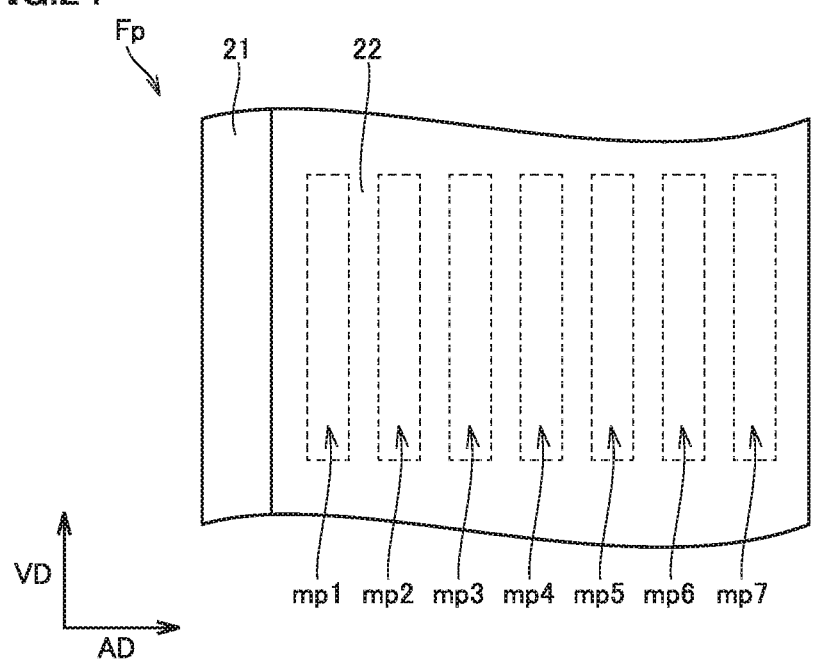
FIG. 24 is a schematic plan view showing a location where a sample for measuring a boron concentration is taken.
Figure 25:
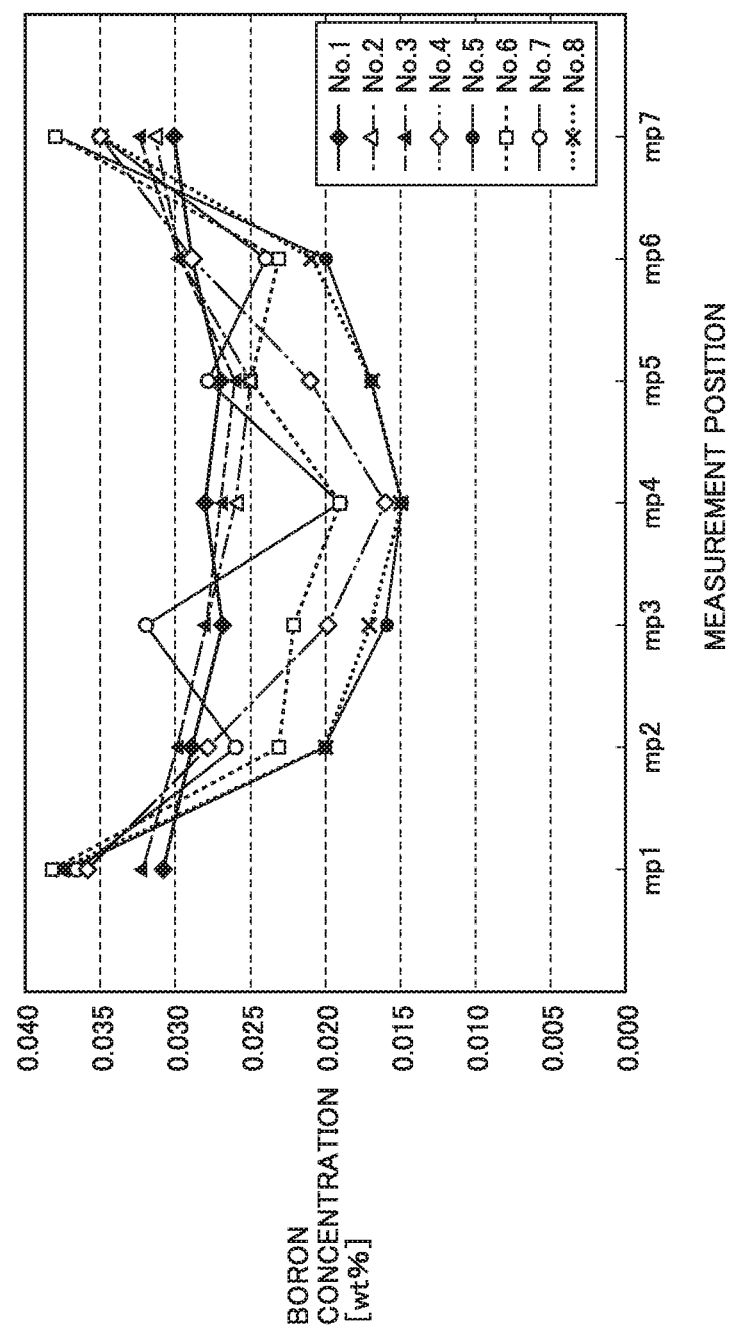
FIG. 25 is a graph showing one example of distribution of a boron concentration in a direction of axis of winding of a negative electrode composite material layer.

Each battery after initial charging and discharging was disassembled and each negative electrode was collected. As shown in FIG. 24, samples (mp1 to mp7) were taken at regular intervals in direction of axis of winding AD and a boron concentration [mass %] was measured with an inductively coupled plasma atomic emission spectrometer (ICP-AES). FIG. 25 and Table 1 show results. Here, boron is a component of a coating derived from an additive (LiBOB). Therefore, distribution of the boron concentration can be regarded as distribution of an amount of the coating.

TABLE 1

|  | Boron Concentration [wt %] | | | | | | | Capacity Retention After 2000 Cycles |
|---|---|---|---|---|---|---|---|---|
|  | mp1 | mp2 | mp3 | mp4 | mp5 | mp6 | mp7 | [%] |
| No. 1 | 0.031 | 0.029 | 0.027 | 0 028 | 0.027 | 0.029 | 0.030 | 86 |
| No. 2 | 0.032 | 0.030 | 0.028 | 0.026 | 0.025 | 0.030 | 0.031 | 84 |
| No. 3 | 0.032 | 0.030 | 0.028 | 0.027 | 0.026 | 0.029 | 0.032 | 83 |
| No. 4 | 0.036 | 0.028 | 0.020 | 0.016 | 0.021 | 0.029 | 0.035 | 72 |
| No. 5 | 0.037 | 0.020 | 0.016 | 0.015 | 0.017 | 0.020 | 0.038 | 73 |
| No. 6 | 0.038 | 0.023 | 0.022 | 0.019 | 0.025 | 0.023 | 0.038 | 69 |
| No. 7 | 0.036 | 0.026 | 0.032 | 0.019 | 0.028 | 0.024 | 0.035 | 62 |
| No. 8 | 0.038 | 0.020 | 0.017 | 0.015 | 0.017 | 0.021 | 0.038 | 65 |

2. Evaluation of Life of Battery

Figure 26:
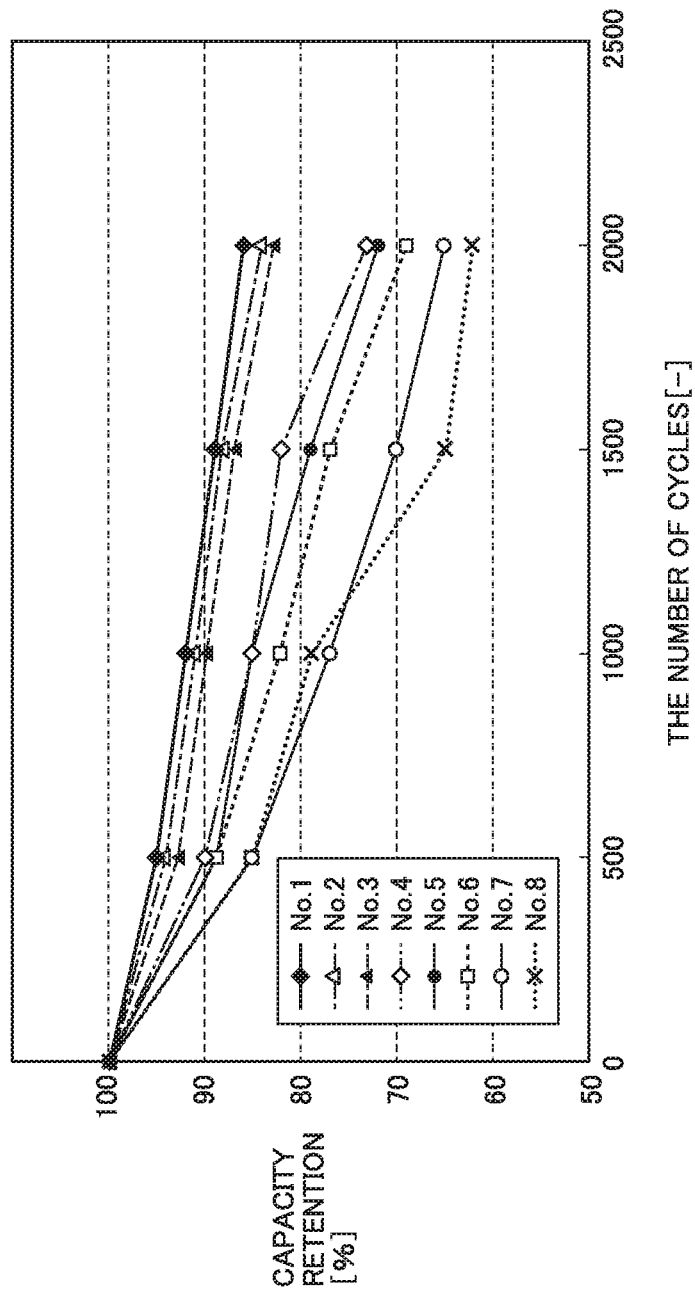
FIG. 26 is a graph showing one example of transition of capacity retention of a non-aqueous electrolytic secondary battery.

Two thousand constant current cycles were carried out for each battery. A capacity was checked in the first cycle and every 500 cycles, and capacity retention [%] was calculated by dividing a post-cycle capacity by a capacity in the first cycle. FIG. 26 shows transition of the capacity retention. Table 1 shows the capacity retention after 2000 cycles. Conditions for a constant current cycle and a condition for checking a capacity used here are shown below.

(Conditions for Constant Current Cycle)

Charging: current value of 6 A and cut-off voltage of 4.1 V

Discharging: current value of 240 A and cut-off voltage of 3.0 V

Environmental temperature: 60° C.

(Conditions for Checking Capacity Every 500 Cycles)

Charging: current value of 8 A and cut-off voltage of 4.1 V

Discharging: current value of 8 A and cut-off voltage of 3.0 V

Environmental temperature: 60° C.

<Results and Discussion>

1. Uniformity of Coating

Based on FIG. 25 and Table 1, in specimens Nos. 1 to 3, a difference in boron concentration is smaller in mp3 to mp5 corresponding to the central portion of the negative electrode composite material layer and mp1 and mp7 corresponding to the end portions than in specimens Nos. 4 to 8. Namely, it can be concluded that a coating was uniformly formed in specimens Nos. 1 to 3 than in specimens Nos. 4 to 8.

The reason for such results may be because, in specimens Nos. 1 to 3, by arranging starting portion Tr0 of communication groove Tr closer to bottom portion 51 relative to first terminal end portion Tr1 and second terminal end portion Tr2, a gas was easily removed during impregnation and the electrolyte reached the central portion. In contrast, removal of the gas does not seem to be sufficient with the communication grooves in shapes as in specimens Nos. 5 to 8.

2. Life of Battery

Based on FIG. 26 and Table 1, cycle life of specimens Nos. 1 to 3 is better than that of specimens Nos. 4 to 8. It can be seen from this result that life of a battery can be extended by uniformly forming a coating.

Though one embodiment and examples of the present invention have been described above, the embodiment and the examples disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 2 granule; 10 positive electrode; 11 positive electrode collector core material; 12 positive electrode composite material layer; 20 negative electrode; 21 negative electrode collector core material; 22 negative electrode composite material layer; 40 separator 50 prismatic case; 51 bottom portion; 52 sidewall; 53 lid; 70 positive electrode terminal; 72 negative electrode terminal; 74 positive electrode collector plate; 76 negative electrode collector plate; 80 flat electrode winding assembly; 81 flat portion; 82 bent portion; 90 forming and transfer apparatus; 91, 92, 93 roll; 92a mark; 94 partition member, 95 feeder; A1, A2 arrow; AD direction of axis of winding; CR central portion; E1 first end portion; E2 second end portion; Ep exposed portion; Fp flat-plate portion; La, Le length; Tr, TrA, TrB, TrC, TrD, TrW, TrX, TrY, TrZ communication groove; Tr0 starting portion; Tr1 first terminal end portion; Tr2 second terminal end portion; Tr3 inclined portion; VD direction; W, Wa1, Wa2, Wc1, Wc2, Wt width; di diameter; dp depth; and H, h height.

The invention claimed is:

1. A non-aqueous electrolytic secondary battery, comprising:
a flat electrode winding assembly including a positive electrode composite material layer and a negative electrode composite material layer; and
a prismatic case including a bottom portion, a sidewall continuing to said bottom portion, and a lid continuing to said sidewall and located opposite to said bottom portion,
said prismatic case accommodating said flat electrode winding assembly such that a direction of axis of winding of said flat electrode winding assembly intersects with a direction from said bottom portion toward said lid,
said flat electrode winding assembly including bent portions and a flat portion, wherein the flat portion is formed by stacking flat-plate portions of said positive electrode composite material layer and said negative electrode composite material layer,
said flat portion facing said sidewall,
said bent portions respectively facing the bottom portion and the lid,
each of said flat-plate portions including a first end portion in said direction of axis of winding, a second end portion located opposite to said first end portion, wherein the first end portion and the second end portion include outermost edges of each of said-flat plate portions in said direction of axis of winding, and a central portion lying between said first end portion and said second end portion, wherein said positive electrode composite material layer and said negative electrode composite material layer are entirely contained within the central portion, wherein the first end portion and the second end portion are exposed portions of a positive electrode collector core material and a negative electrode collector core material which do not include said positive electrode composite material layer and said negative electrode composite material layer,
each of said flat-plate portions of said negative electrode composite material layer being provided with a plurality of communication grooves extending from said first end portion to said second end portion,
each of said communication grooves including (i) a first terminal end portion at said first end portion, (ii) a second terminal end portion at said second end portion, (iii) a starting portion within said central portion, and located closer to said bottom portion relative to said first terminal end portion and said second terminal end portion, and (iv) extending from said starting portion toward said first terminal end portion and said second terminal end portion,
said negative electrode composite material layer including a plurality of granules, and
each of said granules containing a negative electrode active material and a binder.

2. The non-aqueous electrolytic secondary battery according to claim 1, wherein
in each of said flat-plate portions of said negative electrode composite material layer, each of said communication grooves is line symmetric with respect to a straight line passing through said starting portion and extending in a direction intersecting with said direction of axis of winding.

3. The non-aqueous electrolytic secondary battery according to claim 1, wherein
in each of said flat-plate portions of said negative electrode composite material layer, each of said communication grooves extends in a V shape.

4. The non-aqueous electrolytic secondary battery according to claim 1, wherein
at least 2 and no more than 50 of said communication grooves are provided in each one of said flat-plate portions of said negative electrode composite material layer.

5. The non-aqueous electrolytic secondary battery according to claim 4, wherein
relation of $1°<θ×n<90°$ and $\operatorname{Tan}(θ×n)=2H/W$ is satisfied, where n represents the number of said plurality of communication grooves included in each one of said flat-plate portions of said negative electrode composite material layer, W represents a dimension in said direction of axis of winding of each of said flat-plate portions of said negative electrode composite material layer, H represents a dimension in said direction intersecting with said direction of axis of winding of each of said flat-plate portions, and θ represents an angle formed between an inclined portion of each of said communication grooves extending from said starting portion toward said first terminal end portion or said second terminal end portion and said direction of axis of winding.

6. A method of manufacturing the non-aqueous electrolytic secondary battery according to claim 1, comprising:
   a granulation step of obtaining said plurality of granules by mixing and granulating said negative electrode active material, said binder, and a solvent; and
   a forming step of obtaining said negative electrode composite material layer having said plurality of communication grooves by compression forming said plurality of granules between a first roll having in a surface, a mark in a shape in conformity with said plurality of communication grooves and a second roll.

7. The method of manufacturing the non-aqueous electrolytic secondary battery according to claim 6, wherein in said forming step, a ratio of a solid content of said plurality of granules is not lower than 65 mass % and not higher than 80 mass %.

8. The method of manufacturing the non-aqueous electrolytic secondary battery according to claim 6, further comprising, after said forming step, an arrangement step of arranging said negative electrode composite material layer on a negative electrode collector core material and a drying step of drying said negative electrode composite material layer.

9. The non-aqueous electrolytic secondary battery according to claim 1, wherein
   each of said plurality of communication grooves opens toward respective side surfaces of said negative electrode composite material layer at said first terminal end portion and said second terminal end portion.

10. A non-aqueous electrolytic secondary battery according to claim 1, wherein
    a bottom of said plurality of communication grooves is located in said negative electrode composite material layer.

* * * * *